(12) United States Patent
Nishio

(10) Patent No.: US 12,265,350 B2
(45) Date of Patent: Apr. 1, 2025

(54) PRINT SYSTEM, INFORMATION PROCESSING APPARATUS, AND NON-TRANSITORY COMPUTER READABLE MEDIUM

(71) Applicant: FUJIFILM Business Innovation Corp., Tokyo (JP)

(72) Inventor: Taku Nishio, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 385 days.

(21) Appl. No.: 17/702,781

(22) Filed: Mar. 23, 2022

(65) Prior Publication Data

US 2023/0100711 A1 Mar. 30, 2023

(30) Foreign Application Priority Data

Sep. 27, 2021 (JP) ................................ 2021-156388

(51) Int. Cl.
*G03G 15/00* (2006.01)
*G06F 3/12* (2006.01)

(52) U.S. Cl.
CPC ..... *G03G 15/6523* (2013.01); *G03G 15/5062* (2013.01); *G03G 15/607* (2013.01); *G03G 15/6555* (2013.01); *G06F 3/1242* (2013.01); *G06F 3/1255* (2013.01)

(58) Field of Classification Search
None
See application file for complete search history.

(56) References Cited

U.S. PATENT DOCUMENTS

| 10,229,398 B2* | 3/2019 | Sun ........................ G06Q 20/18 |
| 2005/0203805 A1* | 9/2005 | Clough .................. G06Q 50/10 |
| | | 705/26.1 |
| 2015/0254028 A1* | 9/2015 | Okada ................ G06K 15/1876 |
| | | 358/1.15 |
| 2019/0095159 A1* | 3/2019 | Munteanu .......... H04N 1/00957 |
| 2021/0165620 A1* | 6/2021 | Morita .................. G06F 3/1288 |

FOREIGN PATENT DOCUMENTS

JP 2003305915 10/2003

* cited by examiner

*Primary Examiner* — Haris Sabah
(74) *Attorney, Agent, or Firm* — JCIPRNET

(57) ABSTRACT

An information processing apparatus includes a processor configured to: receive multiple print instructions; and generate a new print instruction including the multiple received print instructions, the new print instruction being an instruction in which at least one predetermined page is added to the top or end of a second print instruction, the second print instruction having a page count less than the page count of a first print instruction, the page count of the first print instruction being the highest among the multiple print instructions, the at least one added, predetermined page having a page count equal to the difference between the page count of the first print instruction and the page count of the second print instruction.

20 Claims, 17 Drawing Sheets

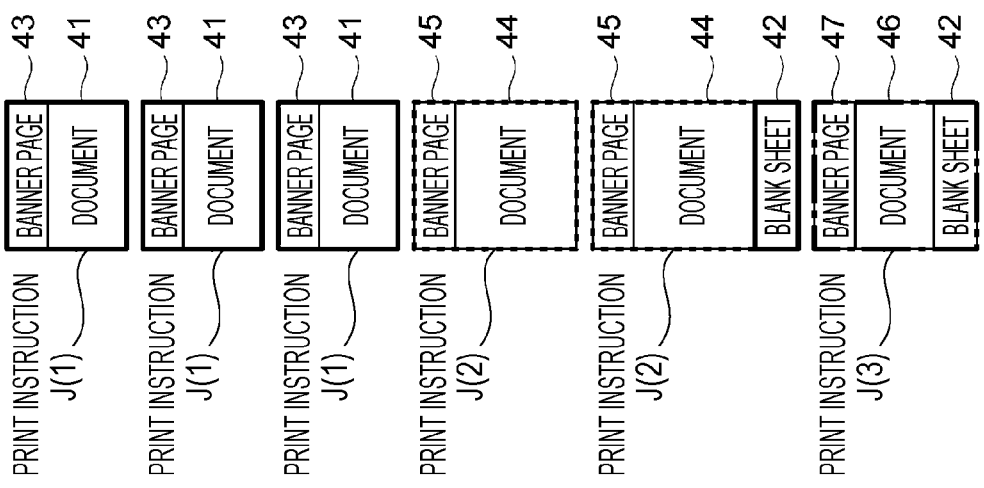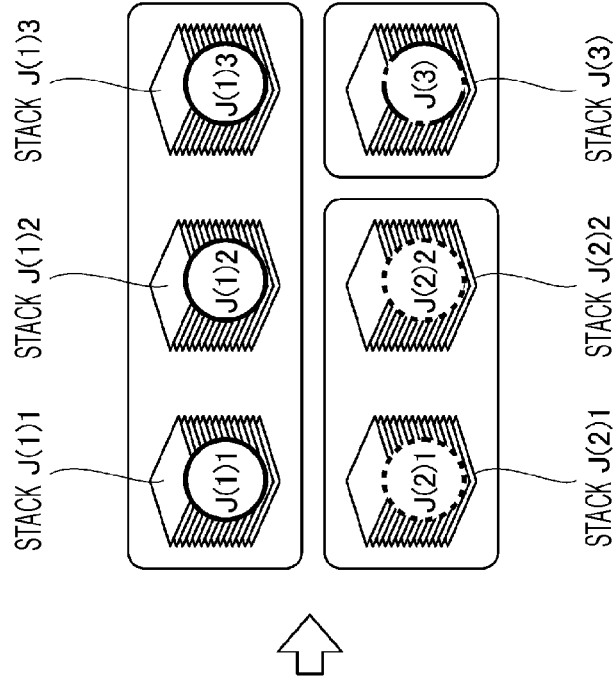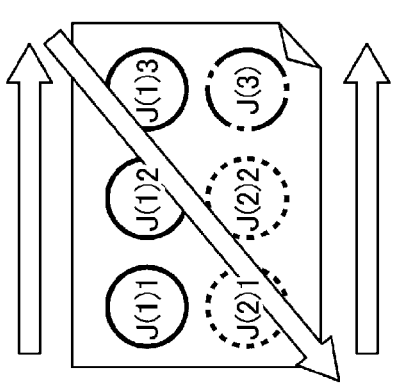

PRINT SYSTEM, INFORMATION PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-156388 filed Sep. 27, 2021.

BACKGROUND

(i) Technical Field

The present disclosure relates to a print system, an information processing apparatus, and a non-transitory computer readable medium.

(ii) Related Art

For example, Japanese Unexamined Patent Application Publication No. 2003-305915 discloses a print control method including a function of switching print pages so that a booklet in page sequence is obtained through bookbinding; a function of changing the reduction rate of the print pages on each sheet or the margin length of each sheet on the basis of the semicircle of the spine; and a function of printing, on each sheet, a mark for indicating the folding direction and the stacking sequence.

Assume a printer which imposes and prints a single print instruction on sheets, from which printed matter for the print instruction is obtained by cutting and stacking after the printing. When this printer is used to impose, on the same sheet, multiple print instructions having different page counts, it is difficult to perform imposition, from which pieces of printed matter for the respective print instructions are obtained through cutting of the printed sheets.

SUMMARY

Aspects of non-limiting embodiments of the present disclosure relate to a technique which, even when multiple print instructions have different page counts, enables imposition, from which pieces of printed matter for the respective print instructions are obtained through cutting of printed sheets.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a processor configured to: receive a plurality of print instructions; and generate a new print instruction including the plurality of received print instructions, the new print instruction being an instruction in which at least one predetermined page is added to top or end of a second print instruction, the second print instruction having a page count less than a page count of a first print instruction, the page count of the first print instruction being the highest among the plurality of print instructions, the at least one added, predetermined page having a page count equal to a difference between the page count of the first print instruction and the page count of the second print instruction.

BRIEF DESCRIPTION OF THE DRAWINGS

Exemplary embodiments of the present disclosure will be described in detail based on the following figures, wherein:

FIG. 16A is a diagram which describes a concrete example in steps for print instructions, and which illustrates the job list of a new print instruction including the print instructions;

FIG. 16B is a diagram which describes a concrete example in steps for print instructions, and which describes an imposition process on a new print instruction;

FIG. 16C is a diagram which describes a concrete example in steps for print instructions, and which describes stacks formed through cutting after printing.

DETAILED DESCRIPTION

Exemplary embodiments of the present disclosure will be described in detail below by referring to the attached drawings.

Figure 1:
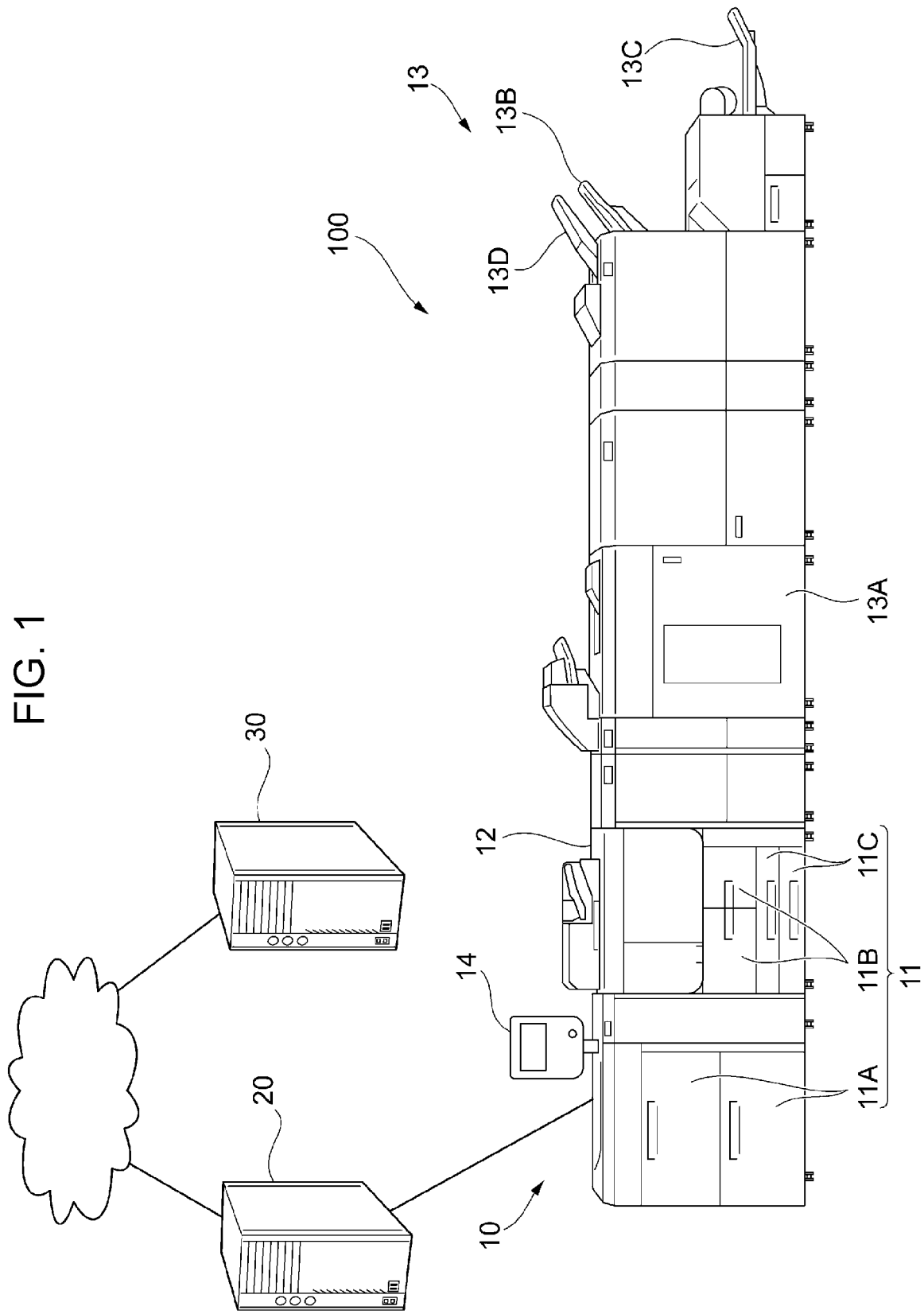
FIG. 1 is a diagram describing the configuration of a print system.

FIG. 1 is a diagram describing the configuration of a print system 100.

The print system 100 in FIG. 1 includes a printer 10 which performs printing on sheets. The printer 10 is connected to servers 20 and 30 communicatively.

The printer 10 prints images on sheets on the basis of an obtained print instruction. A print instruction herein refers to images that are to be printed, and includes information about its page count. A print instruction may include information about the number of copies to be printed, or may include an instruction to perform printing. Such a print instruction is an exemplary print instruction.

The printer 10, which is, for example, a so-called production printer used in business printing, has a function of being capable of performing fast, high-image-quality printing. In addition, the printer 10 has a function of being capable of performing postprocessing on sheets, on which images have been printed, in accordance with a print instruction. Examples of the postprocessing herein include binding a sheet bundle, folding sheets, cutting sheets, and bookbinding.

The printer 10 is not limited to a production printer. A common printer (such as a business printer or a home printer) may be used.

The printer 10 includes a paper feed unit 11, which feeds sheets for printing, a printing unit 12, which performs printing on sheets fed from the paper feed unit 11, multiple discharge destinations 13, to which printed sheets are discharged, and an operation display unit 14 for users.

The paper feed unit 11 includes paper feed trays 11A, 11B, and 11C for feeding sheets. The paper feed trays 11A to 11C may be used to feed sheets whose sizes are different or the same.

The printing unit 12 may use an electrophotographic system which transfers toner, which is adhered to a photoreceptor having been charged and exposed to light, onto recording material, and which fixes and forms an image. In addition, for example, the printing unit 12 may use an inkjet system which ejects ink on recording material to form an image.

The printing unit 12 is capable of performing duplex printing in which printing is performed on both the sides of a sheet. The printing unit 12 may perform a rasterizing process.

According to the present exemplary embodiment, the discharge destinations 13 include a stacker tray 13A, a finisher tray 13B, a finisher discharge tray 13C, and a discharge tray 13D. The transport path for a printed sheet is changed by using a driving source in accordance with a print instruction. Thus, switching to one of the trays 13A to 13D is made to perform continuous printing. A transport path for a sheet is formed, for example, by using transport rolls and guide plate members (not illustrated).

Further description will be made. A unit, which performs postprocessing so that printed sheets are cut to have a standard size such as A4, is provided for the stacker tray 13A in the discharge destinations 13.

The operation display unit 14 includes a display unit, which displays various images for operation and various types of information for notification to users, and an input unit, on which various buttons for input in accordance with operation images on the display unit are disposed. The operation display unit 14 may include, for example, a display screen configured as a touch panel, and may use the touch panel to have functions of the display unit and the input unit.

The printer 10 according to the present exemplary embodiment has a function of printing images on sheets. In addition, the printer 10 has a function of optically reading images such as documents, and a function of transporting documents one by one to its reading area. The listed functions of the printer 10 are merely exemplary. Other functions may be included.

The server 20 is connected to the printer 10 and the server 30 over a network. When the server 20 receives print instructions from the server 30 over the network, the server 20 processes the image data included in the print instructions to generate a new print instruction, and outputs the generated print instruction to the printer 10. The server 20 is an exemplary information processing apparatus.

After an imposition process is performed in accordance with the new print instruction, a rasterizing process is performed. Rasterized images, which are images obtained through rasterizing, are printed and output by the printer 10. Such an imposition process and such a rasterizing process are performed by the printer 10. Alternatively, a different server (not illustrated) may perform such processes.

The network, over which the printer 10 is connected to the server 20, is, for example, a local area network (LAN). The network, over which the printer 10 is connected to the server 30, is, for example, the Internet.

The server 30 may be connected to a different postprocessing unit (not illustrated) other than the printer 10 over a network.

The servers 20 and 30 may physically constitute a single computer, or may be implemented through distributed processing using multiple computers.

Imposition methods performed when multiple pages are disposed on each sheet will be described.

Figure 2A:
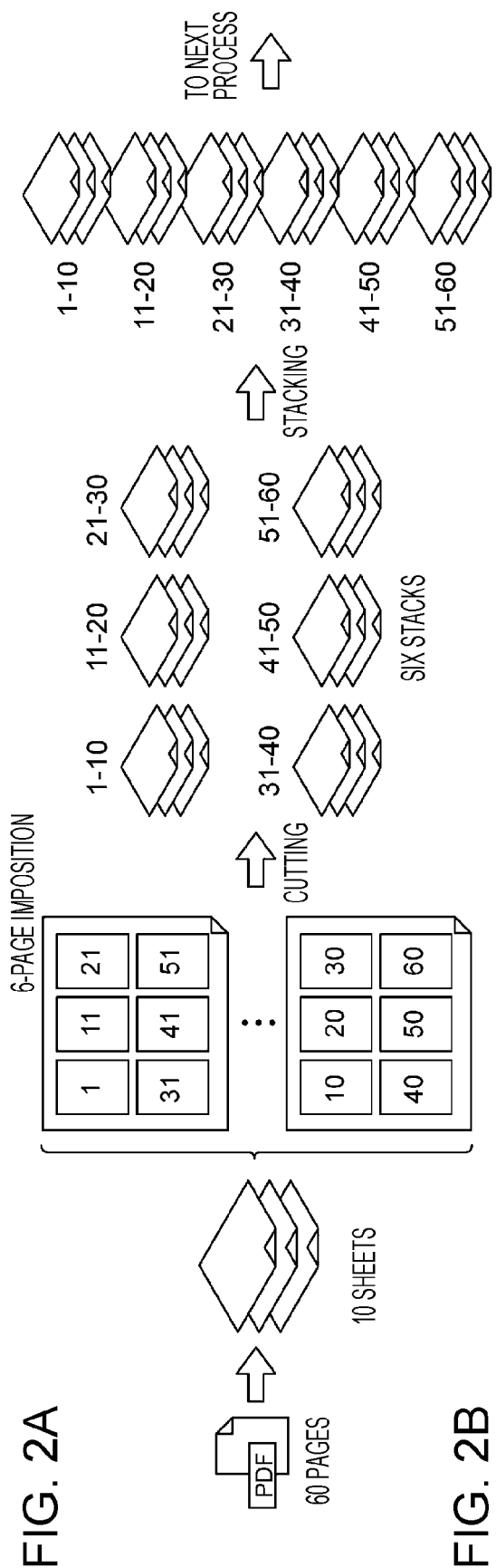
FIG. 2A is a diagram describing an exemplary imposition method of cut and stack imposition.
Figure 2B:
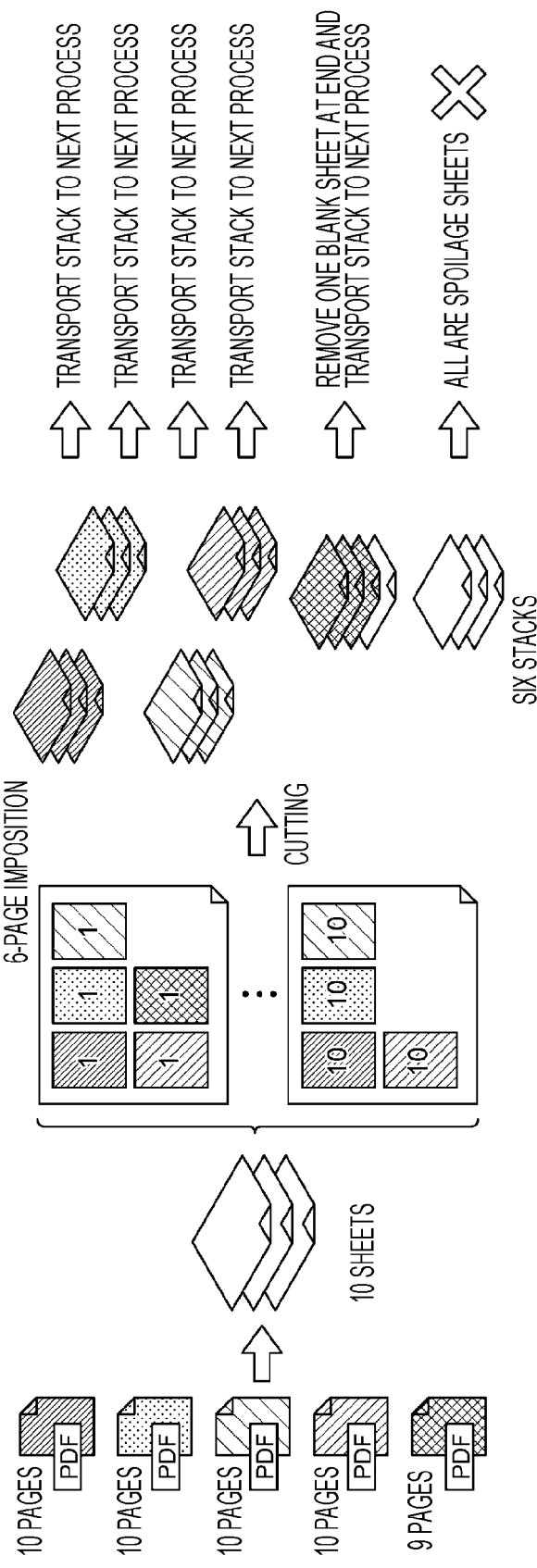
FIG. 2B is a diagram describing an exemplary imposition method of cut and split imposition.

FIG. 2A is a diagram describing an exemplary imposition method of cut and stack imposition. FIG. 2B is a diagram describing an exemplary imposition method of cut and split imposition.

Numerals, which are illustrated without any other characters in FIGS. 2A and 2B, indicate page numbers. A bundle of print sheets, which are obtained through cutting for separation in accordance with their layout, may be called a "stack".

The cut and stack imposition illustrated in FIG. 2A is an imposition method of arranging multiple pages on a single sheet so as to obtain the following print result. The sheets, which have been printed and have the same layout, are stacked and then cut. When the cut results are stacked, the sheets are arranged in the original sequence.

The example in FIG. 2A describes the cut and stack imposition in which, for example, in single-side printing on 60 pages, six pages are disposed on each sheet. The print result is constituted by 10 sheets. That is, the images of page 1, page 11, page 21, page 31, page 41, and page 51 are disposed in this sequence on the first sheet. The images of page 10, page 20, page 30, page 40, page 50, and page 60 are disposed in this sequence on the last 10th sheet.

The 10 printed sheets are stacked and cut so that the pages are separated from each other. Thus, six stacks, in which pages 1 to 10, pages 11 to 20, . . . , pages 51 to 60 are separated from each other, are formed. By stacking the six stacks on top of one another, printed matter in sequence from page 1 to page 60 is formed, and is transported to the next process.

The cut and split imposition illustrated in FIG. 2B is an imposition method of disposing multiple pages in the assumption that, in ganging, sheets, which have been printed and which have the same layout, are stacked and then cut, and that the stacks are transported to corresponding different processes. The ganging herein indicates a generic name of a method, or an imposition method, of disposing multiple different print instructions on a single sheet and printing the print instructions at a time. The ganging is a method which achieves a reduction of cost of plates.

The example in FIG. 2B describes the case of cut and split imposition in which six pages are imposed by using four 10-page print instructions and one 9-page print instruction. The print result is constituted by 10 sheets. That is, only the first pages of the five print instructions are sequentially disposed on the first sheet. The 10th pages of the four print instructions are sequentially disposed on the last 10th sheet.

The 10 stacked, printed sheets are cut so that the pages are separated from each other. Thus, the six stacks, which include five stacks for the five print instructions and one stack having only blank sheets, are formed in total. The stack having blank sheets is handled as spoilage. In contrast, four of the five stacks are transported to corresponding next processes. The remaining one stack, from which the single blank sheet at the end has been removed, is transported to a corresponding next process.

Employment of the cut and split imposition causes operation to be made efficient because gathering of stacks, which are obtained through cutting, is not necessary before transportation to the next process. In addition, employment of the cut and split imposition causes business to be made efficient due to use of the maximum sheet size.

In contrast, in the example of the cut and split imposition in FIG. 2B, a single print instruction needs to correspond to only one stack. Therefore, for example, in the case where the number of pages disposed on a single sheet is not equal to the number of print instructions handled in ganging, or where print instructions handled in ganging have different page counts, the spoilage rate is increased, or time and labor occurs to remove blank sheets.

The printer 10 (see FIG. 1) is of a model which is not compatible with the method (cut and split imposition) of imposing pages so that the cut results for multiple different jobs correspond to the respective jobs. However, the printer 10 is of a model which is compatible with the method (cut and stack imposition) of imposing pages so that, just after cutting, pages are arranged in page sequence. With use of such a model, which simply implements the cut and stack imposition, even if multiple print instructions have different page counts, print operation may be made efficient, or print cost may be reduced.

Accordingly, the present exemplary embodiment enables imposition, from which pieces of printed matter for the respective print instructions are obtained through cutting of the printed sheets. To do this, the server 20 (see FIG. 1) has a function of generating a new print instruction, in which blank pages are added and which performs cut and stack imposition using multiple print instructions. The new print instruction is transmitted to the printer 10 (see FIG. 1), and an imposition process and a rasterizing process are performed on the new print instruction before printing and cutting.

Figure 3:
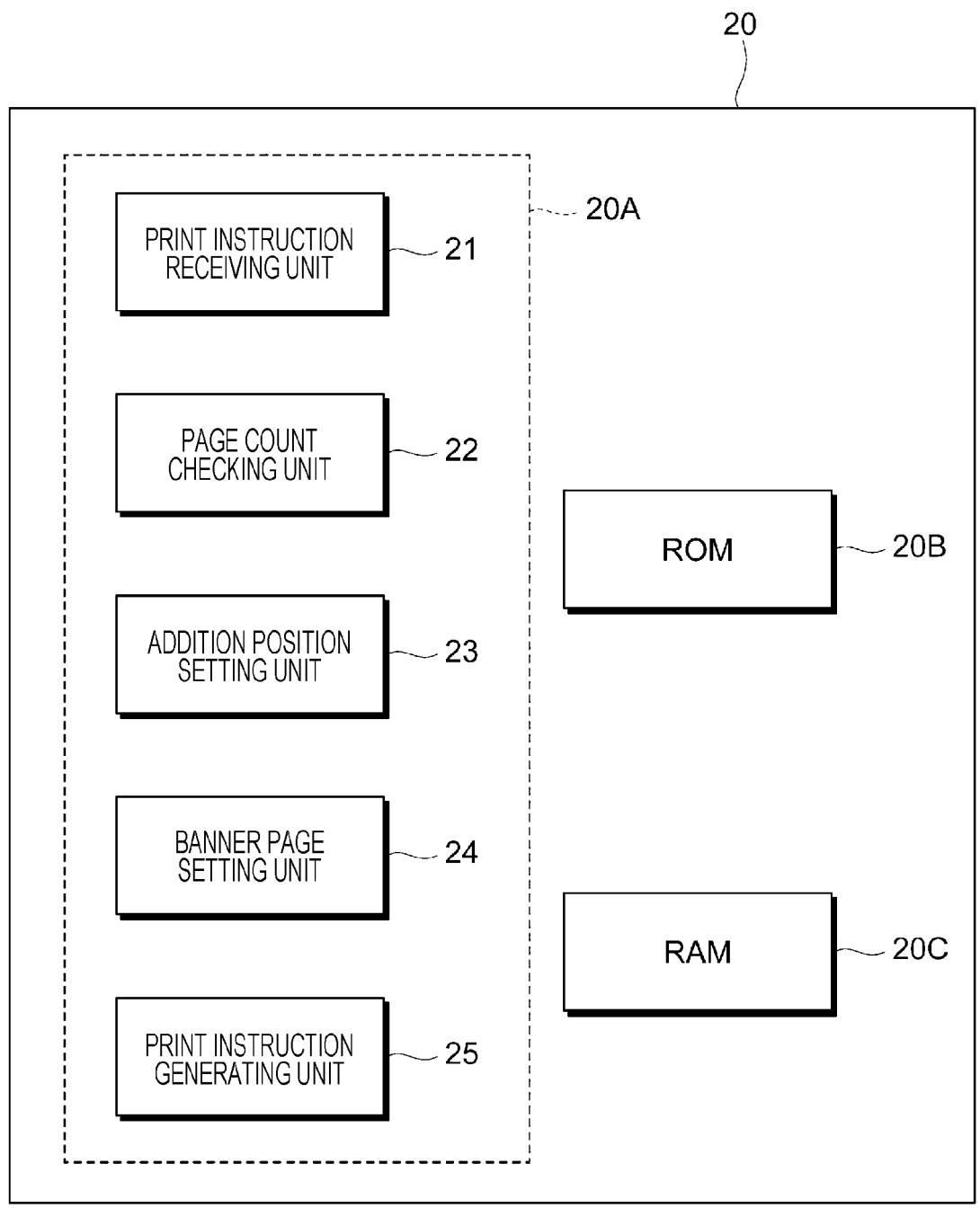
FIG. 3 is a functional block diagram of a server.

FIG. 3 is a functional block diagram of the server 20.

As illustrated in FIG. 3, the server 20 includes a print instruction receiving unit 21, a page count checking unit 22, an addition position setting unit 23, a banner page setting unit 24, and a print instruction generating unit 25.

The print instruction receiving unit 21 receives multiple print instructions transmitted from users, and manages the received print instructions.

The print instruction receiving unit 21 transmits the received print instructions to the page count checking unit 22, and thus obtains page count information of the print instructions.

When a predetermined condition is satisfied, the print instruction receiving unit 21 determines that a time when the print instruction generating unit 25 is to generate a new print instruction has come, and transmits the received print instructions, for example, to the addition position setting unit 23.

The page count checking unit 22 checks the page counts of the print instructions, and checks each print instruction as to whether the print instruction is for printing multiple copies.

If a print instruction is for printing multiple copies, the page count checking unit 22 checks the page count on the basis of the total of page counts of the multiple copies and on the basis of the page count of each copy. The total herein indicates a value obtained by summing the page counts of the copies, that is, a value obtained by multiplying the page count of a single copy by the number of copies.

The page count checking unit 22 specifies a print instruction whose page count is the highest among the multiple print instructions. The print instruction thus specified may be one print instruction, or may be multiple print instructions.

The specified print instruction is an exemplary first print instruction having the highest page count.

The addition position setting unit 23 sets an addition position, at which blank pages are to be added, to a print instruction that needs addition of the blank pages. The addition position setting unit 23 sets the number of blank pages that are to be added.

A blank page is an exemplary predetermined page.

The banner page setting unit 24 sets the content of a banner page added on the first page. The banner page indicates a page in which information corresponding to a work instruction is described so that individual stacks may be managed after cutting, and is also referred to as a face sheet.

The banner page is an exemplary image page indicating information about a print instruction.

The content of a banner page is an image indicating information about a print instruction received by the print instruction receiving unit 21. On a banner page, images for the corresponding print instruction received by the print instruction receiving unit 21 are not printed, but a part of such an image (for example, a reduced image of the first page) may be printed for users. One-dimensional or two-dimensional identification information (for example, a bar code) may be added to the banner page.

So-called cross marks, which are marks for cutting, are added to a banner page.

The information about a print instruction, which is described above, is, for example, identification information of a print instruction and information indicating the number of copies to be printed. The identification information of a print instruction is exemplary information about a print instruction. The information indicating the number of copies to be printed is exemplary information about a copy count.

The information about a print instruction may be information indicating whether blank pages have been added, and/or how many blank pages are included when blank pages have been added. Such information about blank sheets is exemplary information indicating whether a predetermined page is included, and exemplary information about the predetermined page when the predetermined page is included.

The print instruction generating unit 25 generates a new print instruction including print instructions received by the print instruction receiving unit 21. In the generated print instruction, blank pages are added at positions which are set by the addition position setting unit 23. The generated print instruction includes images of banner pages which are set by the banner page setting unit 24. The print instruction reproduced by the print instruction generating unit 25 is an exemplary new print instruction.

Instead of the print instructions received by the print instruction receiving unit 21, the print instruction generated by the print instruction generating unit 25 is transmitted to the printer 10.

The functions of the server 20 are implemented by a central processing unit (CPU) 20A which is an exemplary processor. The CPU 20A reads programs stored in a read only memory (ROM) 20B, and executes programs by using a random access memory (RAM) 20C as a work area. The programs executed by the CPU 20A may be provided to the server 20 in the state in which the programs are stored in a computer-readable recording medium, such as a magnetic recording medium (for example, a magnetic tape or a magnetic disk), an optical recording medium (for example, an optical disk), a magneto-optical recording medium, or a semiconductor memory. The programs executed by the CPU 20A may be downloaded to the server 20 by using a communication unit such as the Internet.

In the present exemplary embodiment, the functions of the server 20 are implemented through software. The present disclosure is not limited to this. The functions may be implemented, for example, through an application specific integrated circuit (ASIC).

Description about First to Third Use Examples as Use Examples

Figure 4:
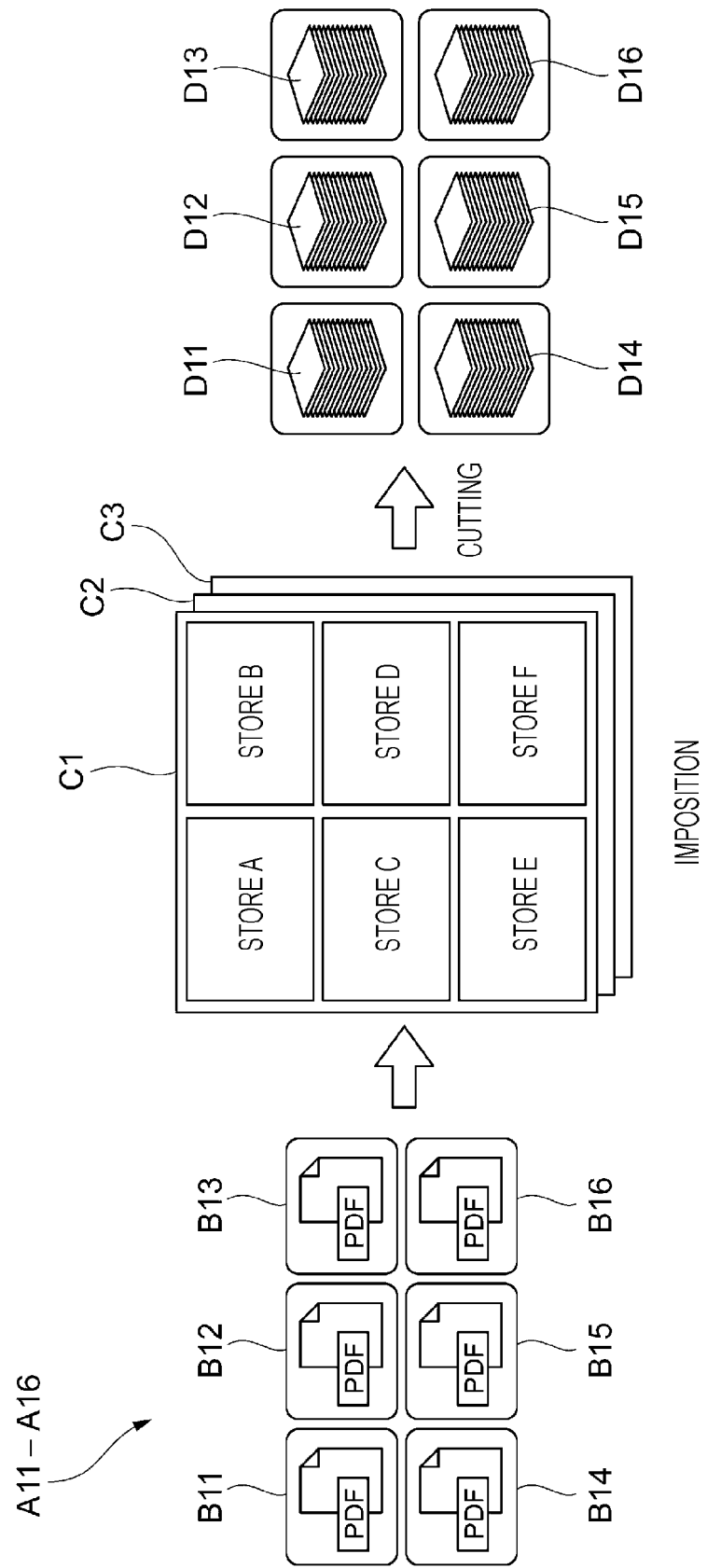
FIG. 4 is a diagram describing a first use example in which a server generates a new print instruction.
Figure 5:
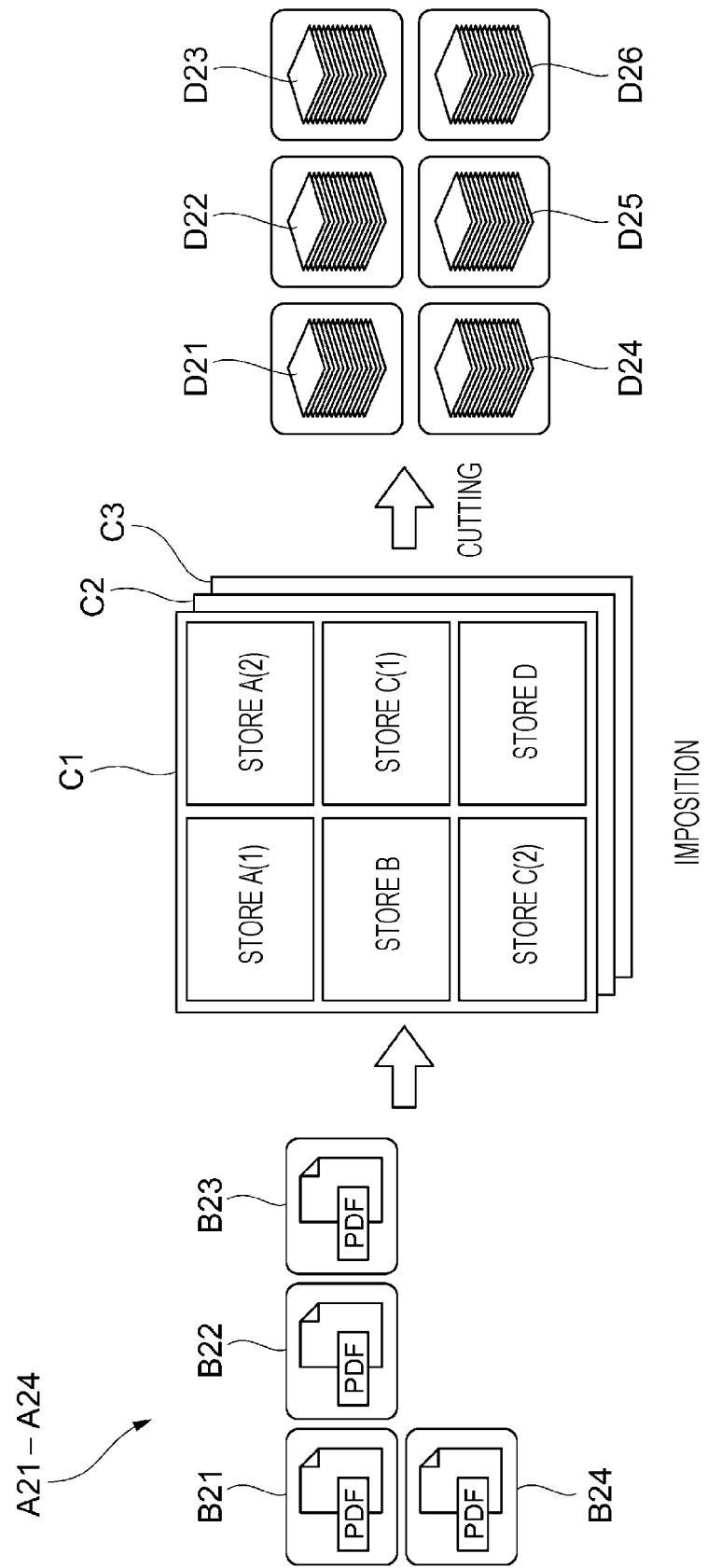
FIG. 5 is a diagram describing a second use example in which a server generates a new print instruction.
Figure 6:
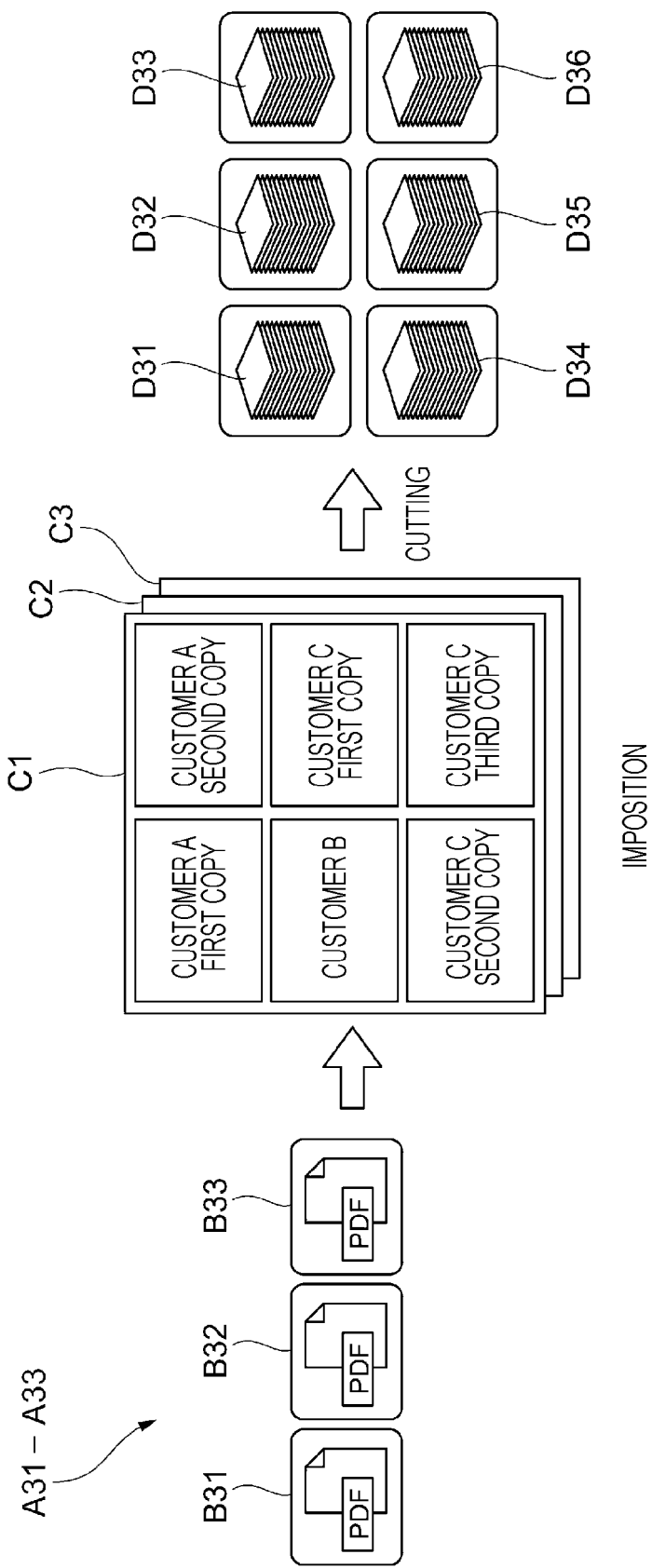
FIG. 6 is a diagram describing a third use example in which a server generates a new print instruction.

Use examples about generation of a new print instruction by the server 20 will be described by using FIGS. 4 to 6. FIG. 4 is a diagram describing a first use example in which the server 20 generates a new print instruction; FIG. 5, a second use example; FIG. 6, a third use example.

The first use example illustrated in FIG. 4 describes the case in which pages of a single print instruction are stacked in a single stack. The second use example illustrated in FIG. 5 describes the case in which pages of a single print instruction, which is not for printing multiple copies, are stacked in multiple separate stacks, that is, the case in which, in printing one copy of a single print instruction, the pages are stacked in multiple separate stacks. The third use example illustrated in FIG. 6 describes the case in which, in printing multiple copies of a single print instruction, the copies are separated into the respective stacks, and the number of stacks corresponding to the print instruction is equal to the number of copies.

First Use Example

The first use example illustrated in FIG. 4 describes the case in which imposition, printing, and cutting are performed on six print instructions, print instructions A11 to A16. The print instruction A11 has a file or document (hereinafter referred to as a document) B11. The print instruction A12 to A16 have documents B12 to B16, respectively.

The document B11 has images for store A; the document B12 has images for store B; the document B13 has images for store C; the document B14 has images for store D; the document B15 has images for store E; the document B16 has images for store F.

The documents B11 to B16 have the same page count. However, the documents B11 to B16 may have different page counts.

The documents B11 to B16 are subjected to 6-page imposition for six divisions obtained by dividing three rows into the left and right divisions. That is, the images in the document B11 are disposed on the left in the upper row. The images in the document B12 are disposed on the right in the upper row. The images in the document B13 are disposed on the left in the middle row. The images in the document B14 are disposed on the right in the middle row. The images in the document B15 are disposed on the left in the lower row. The images in the document B16 are disposed on the right in the lower row.

Therefore, the imposed image on the first sheet is an image C1 in which the first pages in the documents B11 to B16 are disposed. The imposed image on the second sheet is an image C2 in which the second pages are disposed. The imposed image on the third sheet is an image C3 in which the third pages are disposed. The imposed image on the last n-th sheet is an image Cn (not illustrated) in which the n-th pages are disposed.

Such images C1 to Cn are printed on sheets which are cut. Then, six stacks D11 to D16 corresponding to the respective print instructions A11 to A16 are formed. Therefore, stacks are formed for the respective stores, enabling the downstream operation to be performed easily.

The print instructions A11 to A16 are for price cards for the respective stores. The documents B11 to B16 are, for example, PDF files.

For price cards, one stack may correspond to one delivery destination. For example, sheets do not need to be switched in the middle of operation. More specifically, when price cards for chain stores are to be printed at a time, the print instructions have almost the same number of sheets (page count). This is suitable for a process using a single stack for a single store. That is, the stacks are not subjected to bookbinding after cutting. Thus, even if the stacks include blank sheets, the stacks just after cutting may be delivered to the stores. The added banner sheets describe their store names. Thus, which stack, obtained through cutting, is to be delivered to which store may be grasped at once.

Second Use Example

The second use example illustrated in FIG. 5 describes the case in which imposition, printing, and cutting are performed on four print instructions, print instructions A21 to A24. Like the first use example, the price cards for each store are printed. The print instructions A21 to A24 have documents B21 to B24, respectively.

The document B21 has images for store A; the document B22 has images for store B; the document B23 has images for store C; the document B24 has images for store D.

The documents B21 and B23 have the same page count. Alternatively, the documents B21 and B23 may have different page counts. The documents B22 and B24 have the same page count. Alternatively, the documents B22 and B24 may have different page counts. More specifically, the documents B21 and B23 have the page count higher than that of the documents B22 and B24. Specifically, in the case of the second use example, the page count of the documents B21 and B23 is approximately twice that of the documents B22 and B24.

Like the first use example, 6-page imposition is performed on the documents B21 to B24. As described above, the page count of the documents B21 and B23 is approximately twice that of the documents B22 and B24. In the second use example, the number of imposed sheets is determined so as to be equal to the lower page count. Thus, the documents B21 and B23 are disposed at two imposition positions. That is, the images in the document B21 are disposed on the right and left in the upper row. The images in the document B22 are disposed on the left in the middle row. The images in the document B23 are disposed on the right in the middle row and on the left in the lower row. The images in the document B24 are disposed on the right in the lower row.

Therefore, when the page count of the documents B22 and B24 is represented by n, the imposed image on the first sheet is an image C1 in which the first pages of the documents B21 to B24 and the (2·n)-th pages of the documents B21 and B23 are disposed. Images C2 to C3 and the last image Cn (not illustrated) are similar to the image C1, and will not be described.

The sheets, on which the images C1 to Cn have been printed, are cut. Then, six stacks D21 to D26 corresponding to the print instructions A21 to A24 are formed. More specifically, among the stacks D21 to D26, the stack D23 corresponds to the print instruction A22, and the stack D26 corresponds to the print instruction A24. The stack obtained by stacking the stack D21 on the stack D22 corresponds to the print instruction A21. The stack obtained by stacking the stack D24 on the stack D25 corresponds to the print instruction A23.

Thus, the stacks for the respective stores are formed, causing the downstream operation to be performed easily.

Third Use Example

The third use example illustrated in FIG. 6 describes the case in which imposition, printing, and cutting are performed on three print instructions, print instructions A31 to A33. Unlike the first use example and the second use example, photobooks are printed. The print instructions A31 to A33 have documents B31 to B33, respectively.

In the case of photobooks, print instructions, having the same page count and the same page configuration, may be collected. In the case of the third use example, the print instruction A32 is for printing one copy. In contrast, the print instruction A31 is for printing two copies, and the print instruction A33 is for printing three copies.

Many photobooks, which are processed digitally, have a fixed page count, and tend to have orders of one to three copies. Arrangement with assignment of one copy to one stack eliminates addition of blank sheets. This may be highly likely to increase efficiency of this print method (imposition).

Since each copy is subjected to bookbinding in postprocessing, one stack per copy increases the efficiency. If, in a grouping condition for grouping, branching is made in accordance with an order number in a catalogue, only jobs having the same page count may be collected. If jobs having the same page count are collected, a thick sheet for the front page may be used for the first page, and a thick sheet may be also used for the last page. In photobooks, sheets used may be changed in the middle of the process, enabling variations of the finish to be coped with.

The document B31 has images for customer A; the document B32 has images for customer B; the document B33 has images for customer C.

The documents B31 to B33 have the same page count. Alternatively, the documents B31 to B33 may have different page counts. In contrast, the documents B31 to B33 are different in the number of copies to be printed. That is, in the third use example, the document B31 is for printing two copies; the document B32 is for printing one copy; the document B33 is for printing three copies.

Like the first use example and the second use example, 6-page imposition is performed on the documents B31 to B33. As described above, the documents B31 to B33 are different in the number of copies to be printed. Thus, the same image of the document B31 is disposed at two imposition positions. The same image of the document B33 is disposed at three imposition positions. That is, the same image of the document B31 is disposed on the left and right in the upper row. An image of the document B32 is disposed on the left in the middle row. An image of the document B33 is disposed on the right in the middle row and on the left and right in the lower row.

Therefore, when the page count of the documents B31 to B33 is represented by n, the imposed image on the first page is an image C1 having the following configuration: page 1 of the document B31 is disposed at two positions; page 1 of the document B32 is disposed at one position; page 1 of the document B33 is disposed at three positions. Images C2 to C3 and the last image Cn (not illustrated) are similar to the image C1, and will not be described.

Cutting sheets, on which such images C1 to Cn have been printed, causes six stacks D31 to D36, corresponding to the print instructions A31 to A33, to be formed. More specifically, the stacks D31 and D32 among the stacks D31 to D36 correspond to the print instruction A31. The stack D33 corresponds to the print instruction A32. The stacks D34 to D36 correspond to the print instruction A33.

Thus, stacks handed over to the customers are formed, causing the downstream operation to be performed easily.

The first use example of one stack for one print instruction, the second use example of multiple stacks for one print instruction (one copy), and the third use example of multiple stacks for one print instruction (multiple copies) are described. However, the present disclosure is not limited to these. For example, when multiple copies are to be printed for one print instruction, all or some of the copies may be stacked in one stack. In this case, the number of stacks corresponding to the print instruction is one in the case of all the multiple copies. The number of stacks is less than the number of copies in the case of some of the multiple copies. In addition, this case corresponds to the case in which, in the first use example in FIG. 4, one print instruction is for printing multiple copies, and this case may be a modified example of the first use example.

In the first use example or the third use example (including a modified example of the first use example), each print instruction is classified on the basis of the number of copies to be printed, that is, whether one copy or multiple copies are to be printed. In addition, each print instruction, whose number of copies to be printed has been classified into either of the types, is further classified on the basis of the number of stacks, that is, whether the pages of the print instruction are stacked in a single stack or multiple stacks.

Further description will be made. When the pages of multiple print instructions are stacked in a single stack, it is difficult to increase the efficiency of the downstream process. Thus, this case is to be excluded. However, when there is a facility which may eliminate users' time and labor for such a stack, the method is applicable.

For example, the printer 10 may include a sorting unit (not illustrated) which is capable of sorting the pages for each print instruction from a single stack.

Even when the printer 10 does not include a sorting unit, information indicating that multiple print instructions are included in a single stack may be transmitted from the server 20 through the server 30 to an external sorting unit (not illustrated) which is a facility other than the printer 10. That is, when a user carries a single stack, as printed matter including multiple print instructions, to an external sorting unit (not illustrated), the sorting unit (not illustrated), which is capable of sorting the pages for each print instruction from the stack on the basis of the information described above, may eliminate users' time and labor.

An exemplary procedure according to the present exemplary embodiment will be described.

Figure 7:
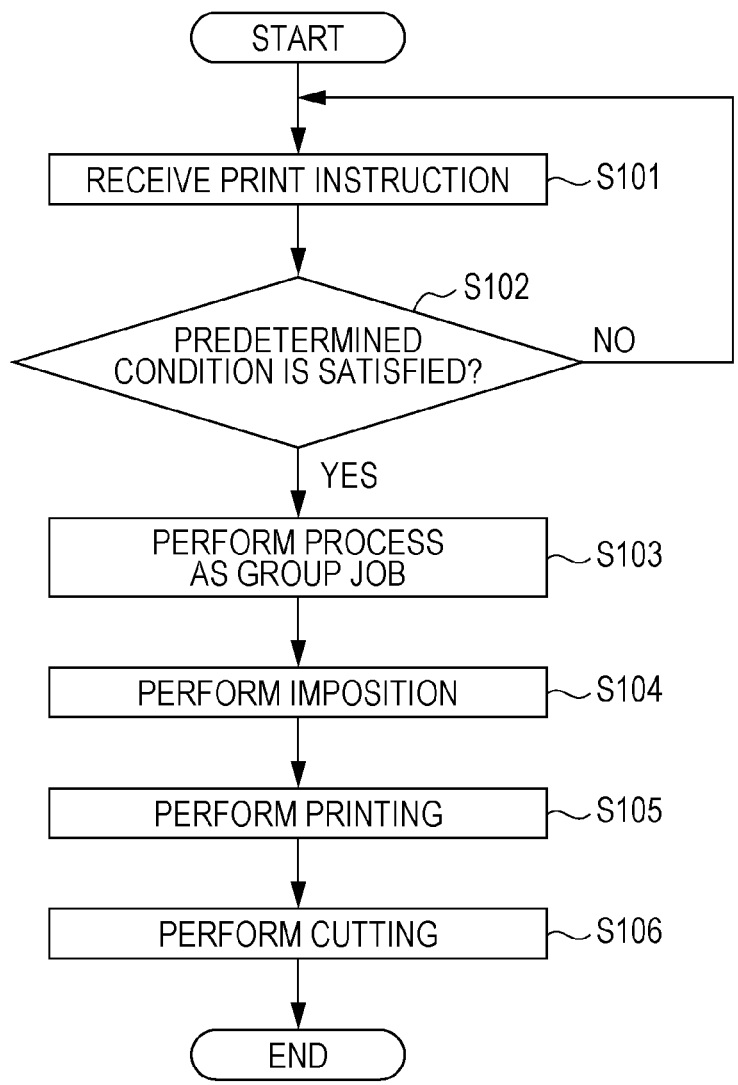
FIG. 7 is a flowchart of an exemplary process according to the present exemplary embodiment.

FIG. 7 is a flowchart of an exemplary process according to the present exemplary embodiment.

In the exemplary process in FIG. 7, when the print instruction receiving unit 21 receives a print instruction (step 101), it is determined whether a predetermined condition is satisfied (step 102).

The predetermined condition is a condition for starting a process for causing the print instruction generating unit 25 to generate a new print instruction, and is, for example, the case in which the total of the specified indexes of the accumulated print instructions exceeds a threshold. Specifically, in the case of 6-page imposition, the condition is, for example, the case in which six print jobs are accumulated, or the case in which a predetermined time has elapsed after five print jobs are accumulated. The condition may be the case in which, if a combination of print instructions that are to be processed has been already determined, the combination is obtained.

The predetermined condition may be the case in which one copy of each print instruction has pages whose number is within a specified range, and in which the total of the numbers of copies is equal to six. For example, the pages of a print instruction, which is for printing three copies, are divided into two parts, the first half and the second half, allowing 6-page imposition to be performed.

When the grouping described above is performed, effective multiple-page imposition may be achieved by performing preprocessing in which branching is made with various conditions being set. This enables more effective use of the functions according to the present exemplary embodiment.

Returning to the exemplary process, the description will be continued.

When the predetermined condition is satisfied (YES in step 102), a process as a group job is performed (step 103). A group job enables multiple print instructions to be managed collectively.

In the process as a group job, the print instructions are classified on the basis of sheet or finishing size. For example, print instructions, whose page counts are close to each other, are collected to a group. In addition, the images of the print instructions are aligned to the portrait or landscape orientation, and, for example, creation of copies through replication, addition of blank sheets, and addition of banner pages are performed. Thus, a new print instruction is generated by the print instruction generating unit 25.

After that, imposition is performed on the new print instruction by using an imposition template (step 104). After a rasterizing process, printing is performed on sheets (step 105). The printed sheets are cut (step 106). Thus, stacks for the print instructions are formed.

If the predetermined condition is not satisfied (NO in step 102), the process returns to step 101.

A first exemplary embodiment will be described.

Figure 8:
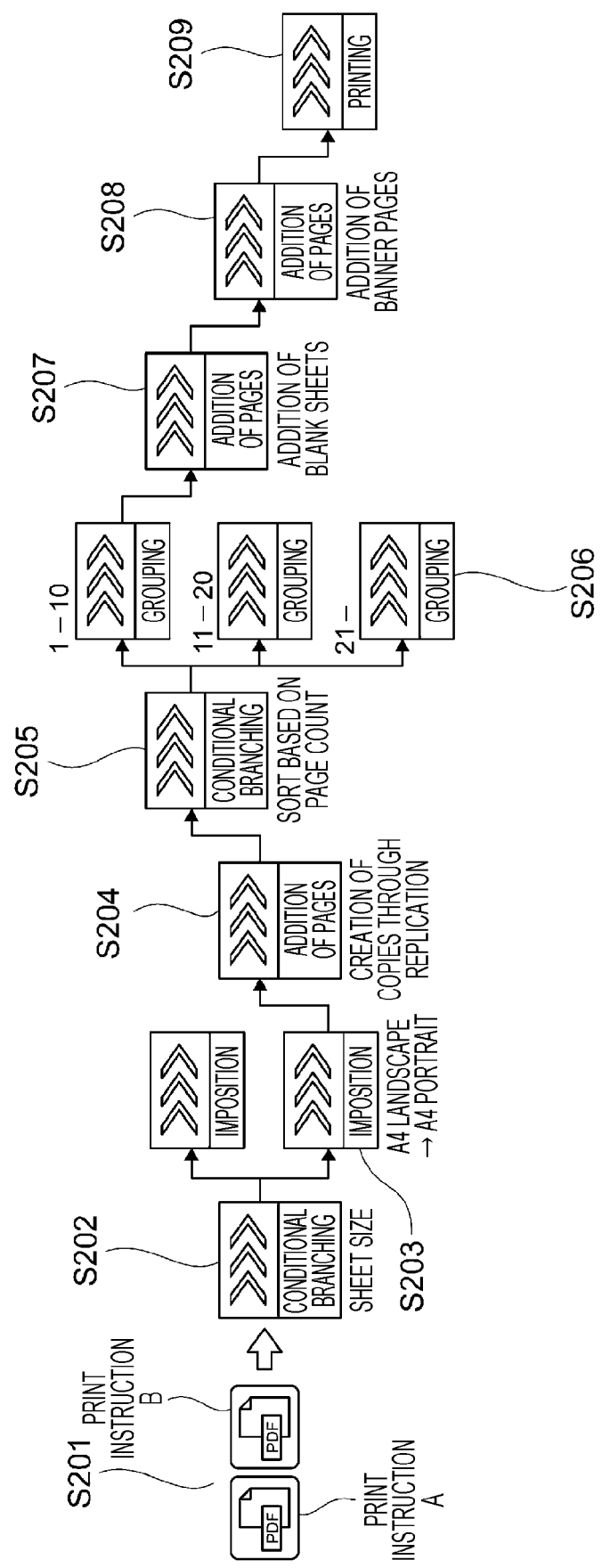
FIG. 8 is a diagram describing a workflow according to a first exemplary embodiment.

FIG. 8 is a diagram describing a workflow according to the first exemplary embodiment, and corresponds to the first use example described above.

The example in FIG. 8 describes the case in which print instructions A and B are received (see step 101 in FIG. 7). When the print instruction receiving unit 21 (see FIG. 3) of the server 20 receives the print instructions A and B (step 201), the print instruction receiving unit 21 checks the sheet sizes of the images of the print instructions A and B, and performs conditional branching to discriminate A4 sheets from the other sheets (step 202).

When both the print instructions A and B are for A4, if the print instructions A and B are for A4 landscape orientation, the orientation is rotated to A4 portrait orientation, and the pages are imposed (step 203). That is, the orientations of the documents of the print instructions A and B are aligned. If the print instructions A and B are not for A4, branching to the upper side of step 203 is made.

If the print instruction A, which has a document having three pages, is for printing three copies, copies are created through replication (step 204) to obtain a print instruction for printing one copy having nine pages. If the print instruction B, which has a document having five pages, is for printing two copies, copies are similarly created through replication (step 204) to obtain a print instruction for printing one copy having 10 pages. If the print instructions A and B are not for printing multiple copies, step 204 is skipped.

Steps 202 to 204 may be preprocessing for grouping. The creation of copies through replication is a process of replicating image data of a print instruction, whose number of copies to be printed is set to more than one, to obtain multiple pieces of image data as many as the specified number of copies, and converting the print instruction into a print instruction for printing one copy. For example, a print instruction for printing 10 copies, each having 100 pages, is converted to a print instruction for printing one copy having 1000 pages.

Then, conditional branching of sorting based on page count is performed (step 205). That is, the number of pages constituting a stack is obtained on the basis of each print instruction, and sorting is performed on the basis of the obtained page count. For example, when the page count checking unit 22 (see FIG. 3) has confirmed that the highest page count is 10, grouping into a group of print instructions having one to 10 pages, a group of print instructions having 11 to 20 pages, and a group of print instructions having 21 or more pages is performed (step 206). Then, when six print instructions, for example, print instructions A to F, are accumulated, the grouping is performed (see step 103 in FIG. 7).

Specifically, the print instructions A and B are sorted into the group of print instructions having one to 10 pages.

After that, the addition position setting unit 23 (see FIG. 3) sets positions, at which blank sheets are to be added, so that the page count is equal to 10 which is the highest page count. The blank sheets are added at the positions which have been set (step 207). Specifically, the print instruction A is converted to a print instruction, having nine pages, by creating copies through replication. Thus, one blank page is added at the end of the documents of the print instruction A.

A banner page, which will be the top page, is added to each stack (step 208). An image printed on a banner page is set by the banner page setting unit 24.

The image printed on a banner page may include, for example, identification information for identifying the print instruction included in the stack, such as the ID or name indicating the print instruction. The image printed on a banner page may also include information about processing work (such as folding) and information about shipping work (such as a delivery destination). In addition, the image printed on a banner page may include information about work for the corresponding stack after cutting, such as a person in charge and a work dead line.

As additional information, the image printed on a banner page may include information about whether the stack includes blank sheets, and information about where blank sheets are included in the stack when the stack includes the blank sheets.

These types of information may be printed as text which is readable by workers, or may be printed as a bar code which is read by machines.

Thus, a new print instruction including the received print instructions A and B is generated by the print instruction generating unit 25 (see FIG. 3). Then, the new print instruction is transmitted as print data from the server 20 to the printer 10 (step 209).

Figure 9A:
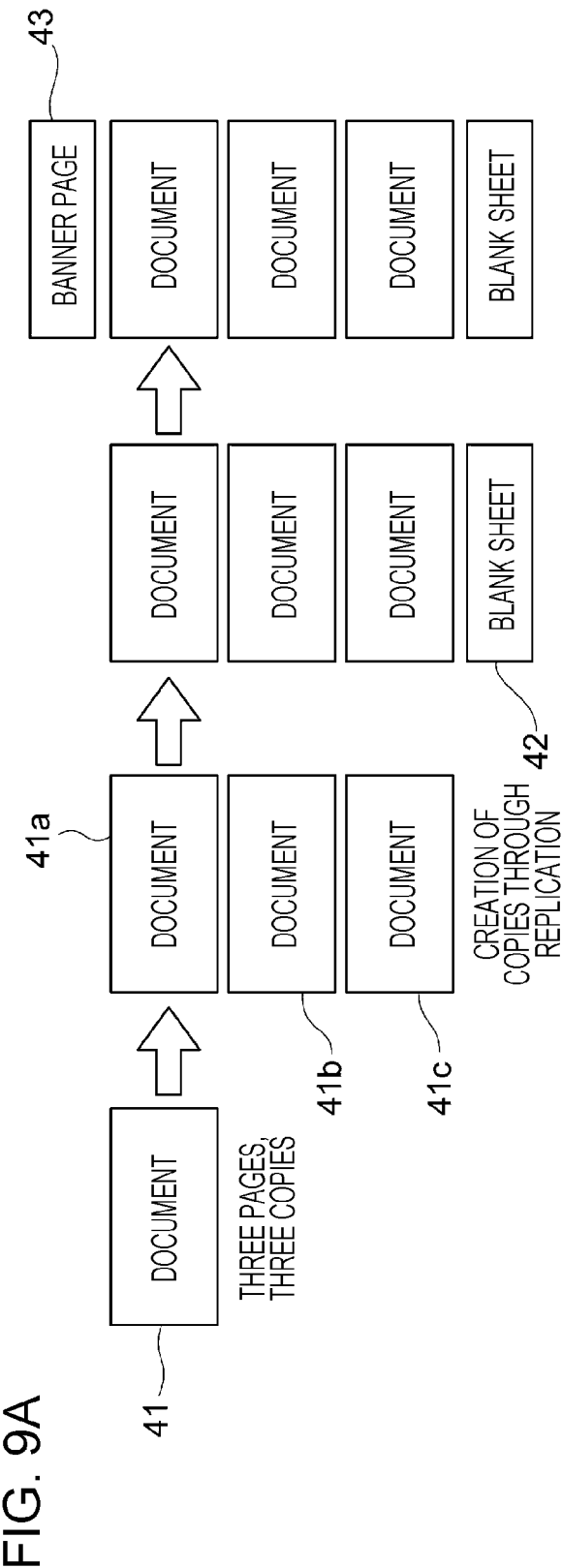
FIG. 9A is a diagram describing a concrete example in steps for a print instruction A.
Figure 9B:
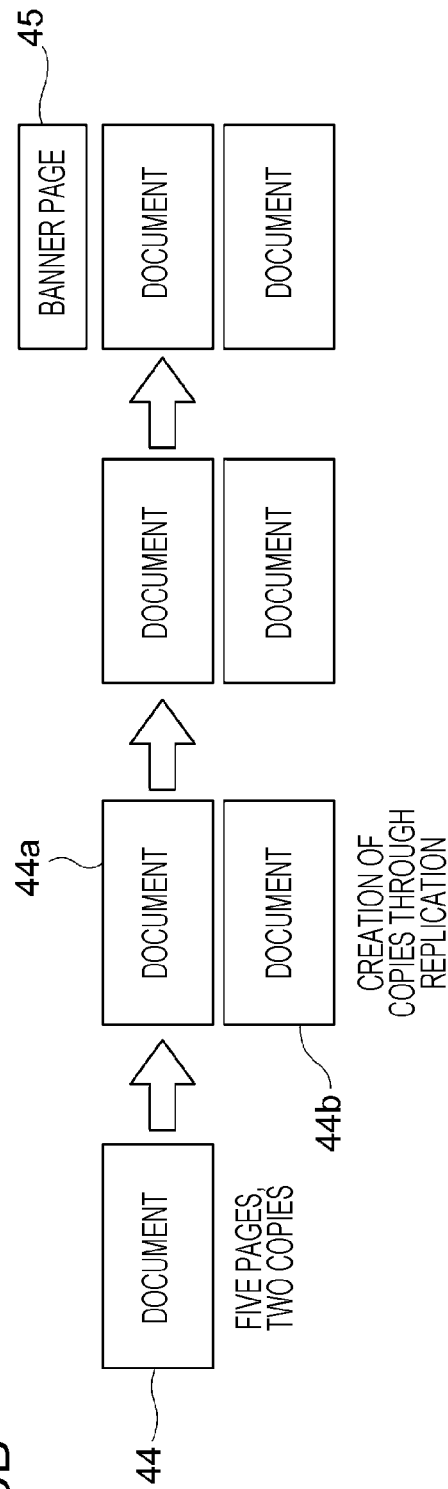
FIG. 9B is a diagram describing a concrete example in steps for a print instruction B.

FIG. 9A is a diagram describing a concrete example in the steps (see FIG. 8) for the print instruction A. FIG. 9B is a diagram describing a concrete example in the steps (see FIG. 8) for the print instruction B.

As illustrated in FIG. 9A, the print instruction A, which has three pages, is for printing three copies. Thus, copies are created through replication (see step 204 in FIG. 8), and a document 41 is replicated to obtain documents 41*a* to 41*c*, of which the total of pages is nine. After that, one blank page 42, whose number is equal to the difference from 10 which is the highest page count, is added to the end (see step 207 in FIG. 8). Then, a banner page 43 is added on the top (see step 208 in FIG. 8).

As illustrated in FIG. 9B, the print instruction B, which has five pages, is for printing two copies. Thus, copies are created through replication (see step 204 in FIG. 8), and a document 44 is replicated to obtain documents 44*a* and 44*b*, of which the total of pages is 10. The page count is equal to the highest page count. Thus, no blank pages are added, and a banner page 45 is added on the top (see step 208 in FIG. 8).

Figure 10A:
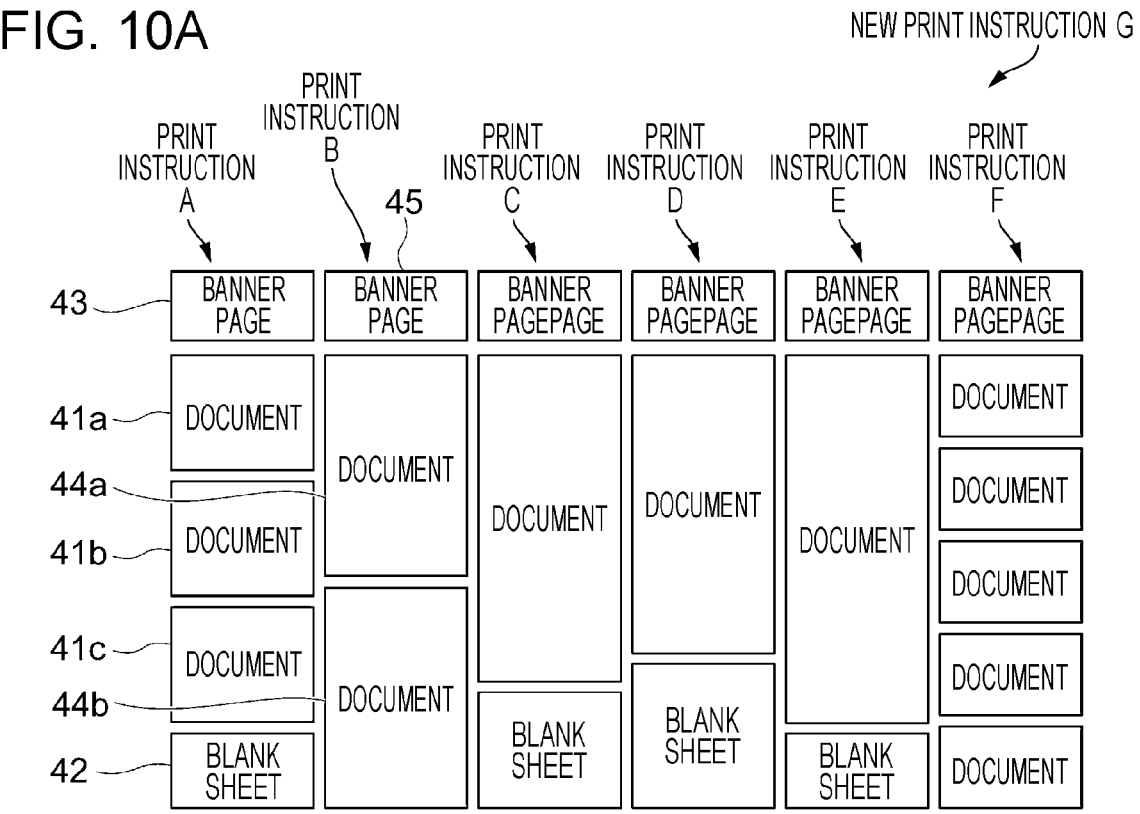
FIG. 10A is a diagram which describes a new print instruction including multiple print instructions and which illustrates the job list of the new print instruction.
Figure 10B:
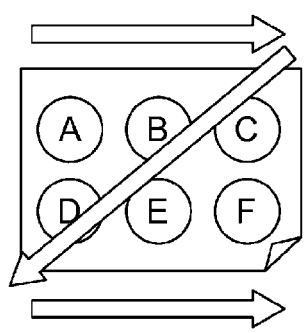
FIG. 10B is a diagram which describes a new print instruction including multiple print instructions, and which describes an imposition process on the new print instruction.
Figure 10C:
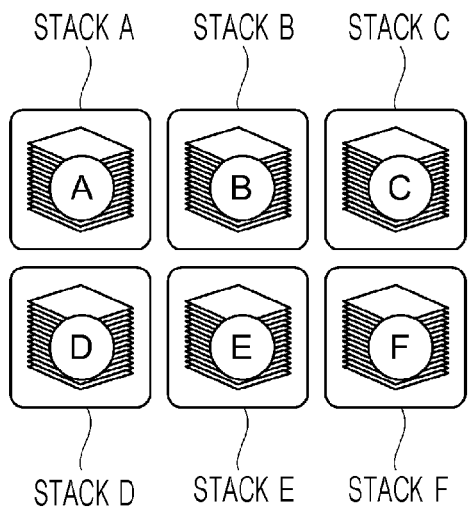
FIG. 10C is a diagram which describes a new print instruction including multiple print instructions, and which describes stacks formed through cutting after printing.

FIGS. 10A to 10C are diagrams describing a new print instruction G which includes the multiple print instructions A and B and which is generated by the print instruction generating unit 25. FIG. 10A illustrates a job list of the new print instruction G including multiple print instructions A to F. FIG. 10B is a diagram describing an imposition process on the new print instruction. FIG. 10C is a diagram describing stacks formed through cutting after printing.

As illustrated in FIG. 10A, the new print instruction G includes the received print instructions A to F. After the documents 41*a* to 41*c* are generated by creating copies through replication, the blank page 42 and the banner page 43 are added to the print instruction A (see FIG. 9A). After the documents 44*a* and 44*b* are generated by creating copies through replication, the banner page 45 is added to the print instruction B (see FIG. 9B).

Addition of the blank page 42 will be further described. For the print instruction A, which has three pages and which is for printing three copies, the total of the page counts of the copies is nine. One blank page, whose number is equal to the difference, is added. The position of the added blank page is determined by using the total. That is, since the total is nine, the blank page 42 is added at the subsequent position of page 9. In other words, the blank page 42 is added at the subsequent position of the last page of the last copy among the copies.

For the print instruction B, which has five pages and which is for printing two copies, since the total of the page counts of the copies is 10 which is equal to the highest page count, the blank page 42 is not added.

Since the print instruction F, which is other than the print instructions A and B, has two pages and is for printing five copies, the total of page counts of the copies is equal to 10 which is equal to the highest page count. Thus, no blank pages are added, and a banner page is added on the top. In other words, for the print instruction F, the total is equal to the page count of the print instruction B, and a position, at which the blank page 42 is to be added, is not set.

In FIGS. 10A to 10C describing the first exemplary embodiment, the print instruction A is an exemplary second print instruction; the print instruction B is an exemplary first print instruction; the print instruction F is an exemplary third print instruction.

For the other print instructions C to E, each of which is for printing one copy, copies are not created through replication, and blank pages, whose number is equal to the difference from 10 which is the highest page count, are added. In addition, banner pages are added on the top.

For example, if the page count of the print instruction C is equal to eight, two blank pages, whose number is equal to the difference, are added at the subsequent position of page 8. For example, if the page count of the print instruction D is seven, three blank pages, whose number is equal to the difference, are added at the subsequent position of page 7. For example, if the page count of the print instruction E is nine, one blank page, whose number is equal to the difference, is added at the subsequent position of page 9.

As illustrated in FIG. 10B, the single pages of the documents of the print instructions A to F are collected and imposed in the order of Z letter. Then, as illustrated in FIG. 10C, stacks A to F are formed through cutting after printing.

A process of changing the number of document copies by creating copies through replication according to the first exemplary embodiment will be described.

Figure 11:
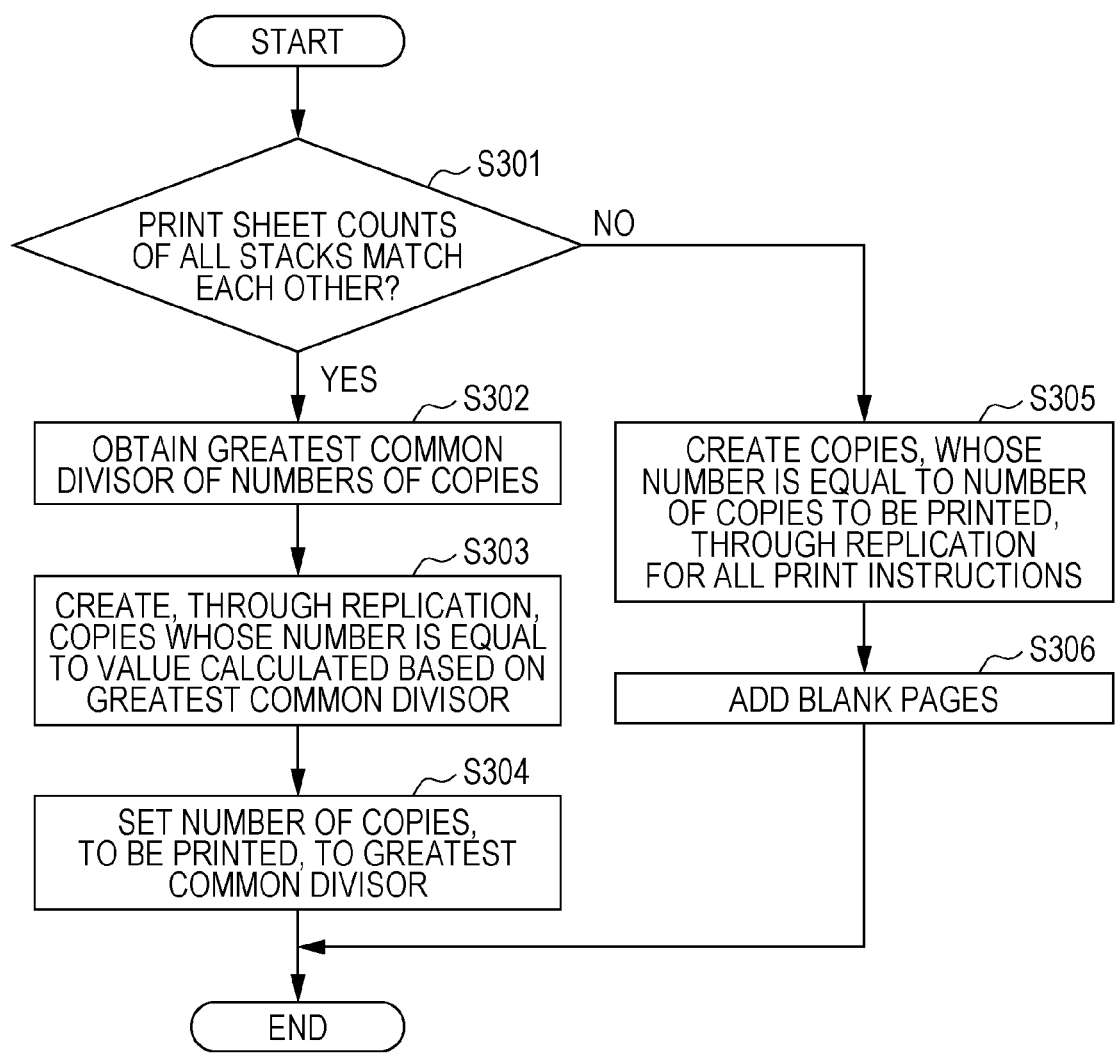
FIG. 11 is a flowchart describing a process of changing the number of document copies by creating copies through replication, according to the first exemplary embodiment.

FIG. 11 is a flowchart describing the process of changing the number of document copies by creating copies through replication according to the first exemplary embodiment.

In the exemplary process in FIG. 11, it is determined whether the print sheet counts of all the stacks formed through cutting after printing match each other (step 301). The print sheet count is a value obtained by multiplying the page count of a print instruction by the number of copies to be printed.

For example, as a simple example for convenience of description, assume the case in which there are a print instruction (called a first print instruction), which has three pages and which is for printing two copes, and a print instruction (called a second print instruction), which has two pages and which is for printing three copies. In this case, the print sheet count of the first print instruction is six (2 pages×3 copies=6). The print sheet count of the second print instruction is six (3 pages×2 copies=6). Thus, the print sheet counts of all the stacks match each other.

If the print sheet counts of all the stacks match each other (YES in step 301), the greatest common divisor of the numbers of copies of the print instructions of the stacks is obtained (step 302) and stored. The print instructions of all the stacks are subjected to creation of copies, through replication, whose number is equal to a value calculated on the basis of the greatest common divisor (step 303). The "value calculated on the basis of the greatest common divisor" in step 303 is calculated from the original number of copies, to be printed, divided by the greatest common divisor. Further, the number of copies, to be printed, of the new print instruction (see the reference character G in FIG. 10) is set to the greatest common divisor (step 304). In this process of changing the number of document copies, the number of copies, to be printed, for all the stacks is one which is the common value.

This will be described by taking the simple example described above. The number of copies (the original number of copies to be printed) of the first print instruction is two, and the number of copies (the original number of copies to be printed) of the second print instruction is three. Thus, the greatest common divisor is one. For the first print instruction, the original number of copies to be printed is divided by the greatest common divisor, and 2/1, that is, two, is calculated. Thus, two copies are created through replication. For the second print instruction, the original number of copies to be printed is divided by the greatest common divisor, and 3/1, that is, three, is calculated. Thus, three copies are created through replication. The number of copies, to be printed, of the new print instruction is set to one.

If the print sheet counts of all the stacks match each other (YES in step 301), no blank pages are added.

In contrast, if the print sheet counts of all the stacks do not match each other (NO in step 301), copies, whose number is equal to the number of copies to be printed, are created through replication for each print instruction (step 305). As a result, the number of copies, to be printed, of the print instruction of each stack is one. After that, blank pages are added so that the page count of each stack matches that of the stack having the highest page count (step 306).

For example, assume the case in which there are a print instruction (called a first print instruction; see the print instruction A in FIG. 9A or 10A), which has three pages and which is for printing three copies, and a print instruction (called a second print instruction; see the print instruction B in FIG. 9B or 10A), which has five pages and which is for printing two copies. In this case, the print sheet count of the first print instruction is nine (3 pages×3 copies=9). The print sheet count of the second print instruction is 10 (5 pages×2 copies=10). The print sheet counts of all the stacks do not match each other.

Copies, whose number is equal to the number of copies to be printed, are created through replication for each print instruction. Then, the print sheet count of the first print instruction, for which three copies each having three pages are created though replication, is nine. The print sheet count of the second print instruction, for which two copies each having five pages are created through replication, is 10. Therefore, one blank page, whose number is equal to the difference, is added to the first print instruction so that the page count of the second print instruction, which is the highest page count and which is 10, matches that of the first print instruction, whose page count is originally nine.

A second exemplary embodiment will be described below.

Figure 12:
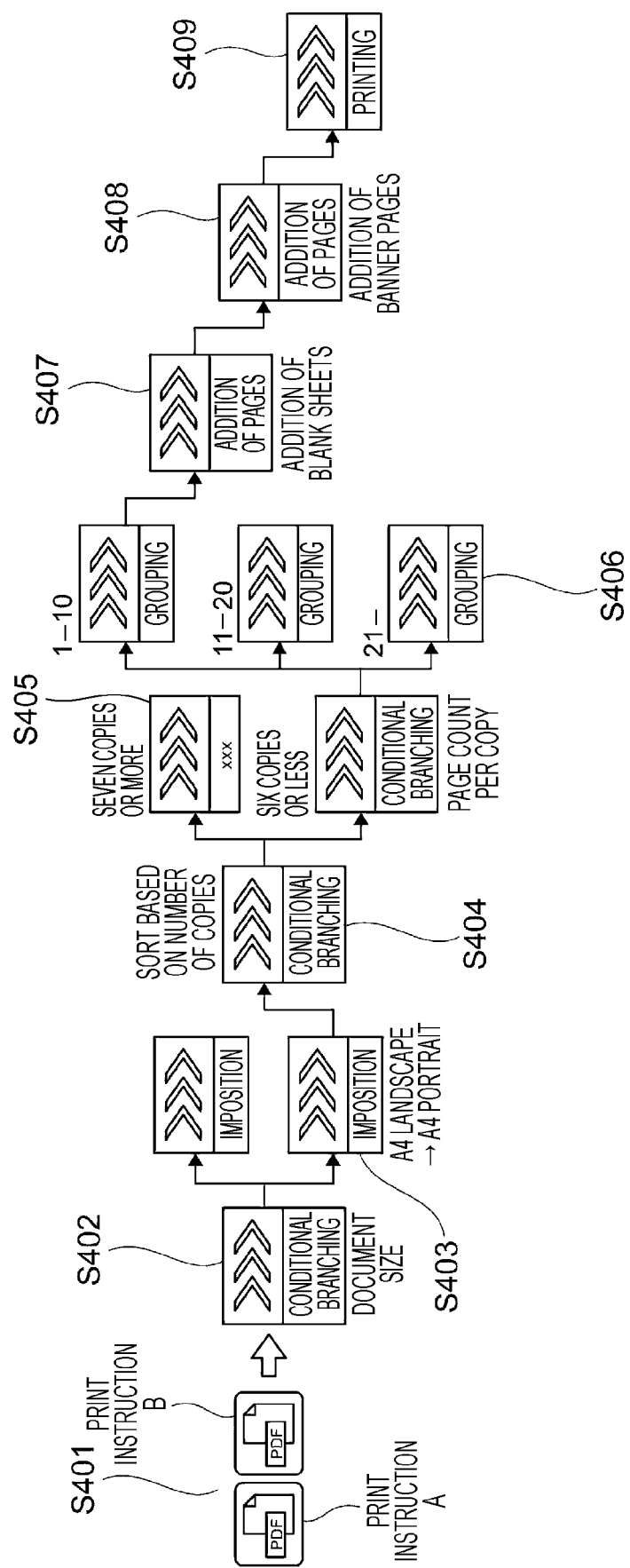
FIG. 12 is a diagram describing a workflow according to a second exemplary embodiment.

FIG. 12 is a diagram describing a workflow according to the second exemplary embodiment, and corresponds to the third use example described above. The example in FIG. 12 has parts common to those in FIG. 8, and the common parts may not be described. Print instructions A to C in the second exemplary embodiment may be different, in page count and the number of copies to be printed, from the print instructions A to C in the first exemplary embodiment.

In the example in FIG. 12, print instructions A and B are received (step 401), conditional branching based on document size is performed (step 402), and imposition is performed with orientation alignment (step 403). Steps 401 to 403 correspond to step 201 to 203 in FIG. 8.

The numbers of copies, to be printed, of the print instructions A and B are checked, and sorting is performed on the basis of the number of copies (step 404). That is, the print instructions are sorted into those for printing copies whose number is equal to or less than six which is used as a threshold, and those for printing copies whose number is equal to or more than seven. The threshold is set to six which is equal to the number of stacks which may be disposed. Alternatively, the threshold may be a different value.

For print instructions for printing copies whose number is equal to or less than six, conditional branching of sorting based on page count per copy is performed (step 405). Grouping into a group of print instructions having one to 10 pages, a group of print instructions having 11 to 20 pages, and a group of print instructions having 21 and more pages is performed (step 406).

Steps 405 and 406 correspond to steps 205 and 206 in FIG. 8. Steps 407 to 409 following steps 405 and 406 correspond to steps 207 to 209 in FIG. 8. These steps are not described.

Figure 13A:
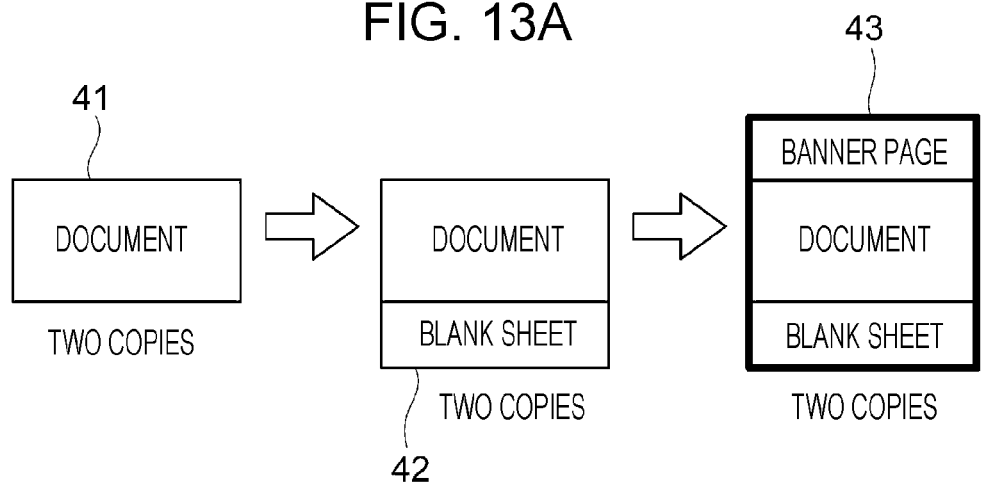
FIG. 13A is a diagram describing a concrete example in steps for a print instruction A.
Figure 13B:
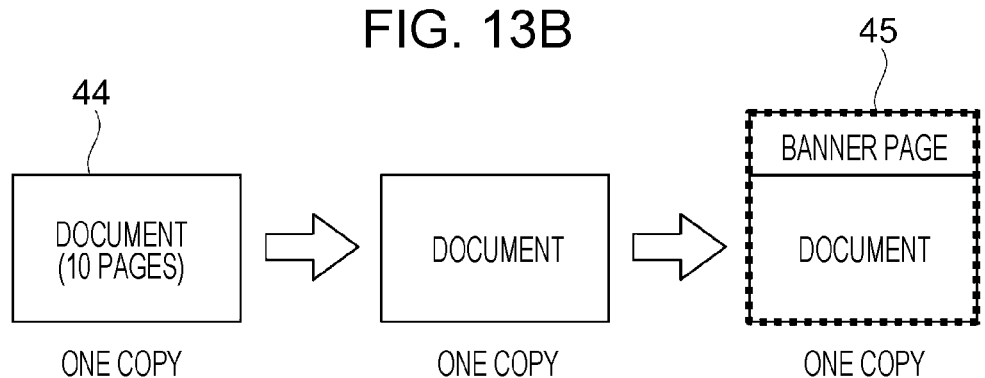
FIG. 13B is a diagram describing a concrete example in steps for a print instruction B.
Figure 13C:
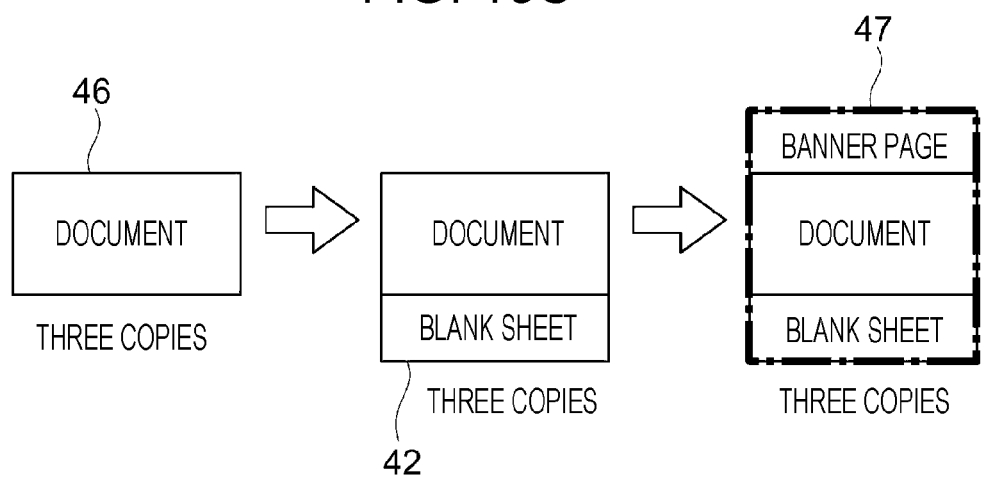
FIG. 13C is a diagram describing a concrete example in steps for a different print instruction C.
Figure 14A:
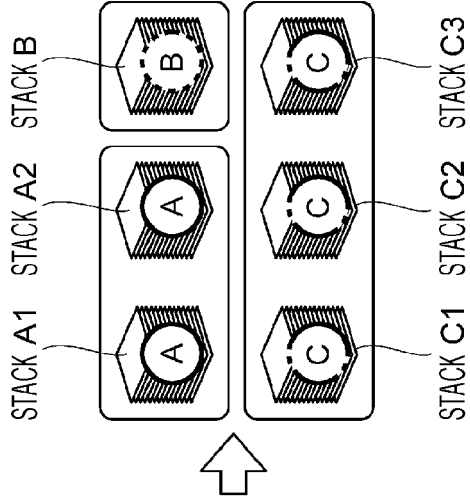
FIG. 14A is a diagram which describes a concrete example in steps for print instructions and which illustrates the job list of a new print instruction including the print instructions.
Figure 14B:
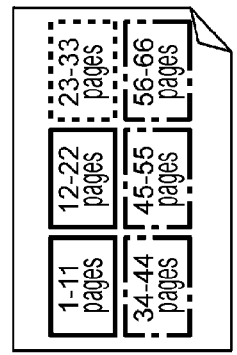
FIG. 14B is a diagram which describes a concrete example in steps for print instructions, and which describes an imposition process on a new print instruction.
Figure 14C:
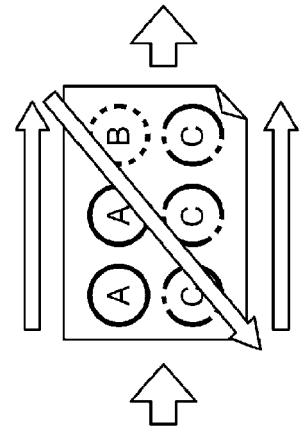
FIG. 14C is a diagram which describes a concrete example in steps for print instructions, and which describes the positions of the imposed pages of a new print instruction.
Figure 14D:
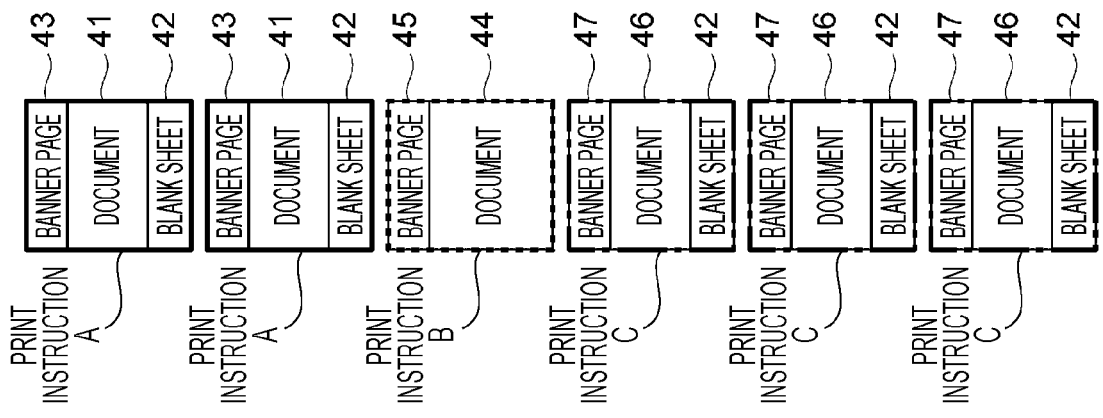
FIG. 14D is a diagram which describes a concrete example in steps for print instructions, and which describes stacks formed through cutting after printing.

FIGS. 13A to 14D are diagrams describing a concrete example in the steps (see FIG. 12) for print instructions. FIG. 13A describes a concrete example of the print instruction A. FIG. 13B describes a concrete example of the print instruction B. FIG. 13C describes a concrete example of another print instruction C which are not illustrated in FIG. 12. FIG. 14A illustrates a job list of a new print instruction G including the multiple print instructions A to C. FIG. 14B is a diagram describing an imposition process on a new print instruction. FIG. 14C is a diagram describing the position of each page of the imposed new print instruction. FIG. 14D is a diagram describing stacks formed through cutting after printing. FIGS. 14A, 14B, 14D correspond to FIGS. 10A to 10C described above.

Among the print instructions A to C illustrated in FIGS. 13A to 14D, the print instruction B has the highest page count.

For the print instruction A, as illustrated in FIG. 13A, blank pages 42 are added at the subsequent position of the document 41, and the banner page 43 is added at the precedent position of the document 41. Since the print instruction A is for printing two copies, when copies are created through replication in this state, as illustrated in FIG. 14A, the print instruction A, which includes the blank pages 42 and the banner page 43, is followed by a copy having the same configuration. When copies are created through replication, depending on the information included in the banner pages 43, the banner pages 43 may have different descriptions, or may have the same description.

For the print instruction B, as illustrated in FIG. 13B, the banner page 45 is added at the precedent position of the document 44. In the case of the print instruction B which has the highest page count among the print instructions, no blank pages are added.

Since the print instruction B is for printing one copy, as illustrated in FIG. 14A, copies are not created through replication.

For the print instruction C, as illustrated in FIG. 13C, blank pages 42 are added at the subsequent position of a document 46, and a banner page 47 is added at the precedent position of the document 46. Since the print instruction C is for printing three copies, when copies are created through replication in this state, as illustrated in FIG. 14A, the print instruction C, which includes the blank pages 42 and the banner page 47, is followed by two additional copies having the same configuration.

For a new print instruction, which is illustrated in FIG. 14A and which includes the print instructions A to C, an imposition template for cut and stack imposition is specified. Thus, as illustrated in FIG. 14B, the single pages of the documents of the print instructions are collected, and are imposed in the order of Z letter. As illustrated in FIG. 14C, page 1 to page 11, page 12 to page 22, ..., page 56 to 66 page are separated from each other. Through cutting after printing, as illustrated in FIG. 14D, stacks A1 and A2, which correspond to the print instruction A for printing two copies, stack B, which corresponds to the print instruction B for printing one copy, and stacks C1, C2, and C3, which correspond to the print instruction C for printing three copies, are formed.

Thus, when blank pages 42 are added to each of the print instructions A and C, the blank pages 42 are added at the subsequent position of the last page of the document before creation of copies through replication. In other words, the position at which blank pages are to be added is determined by using the page count of each copy. More specifically, the position is set to the subsequent position of the last page of each of the copies.

Specifically, the page count of the print instruction A for printing two copies is less than that of the print instruction B. The blank pages 42, whose number is equal to the difference, are added to the last page of each of the first and second copies. The page count of the print instruction C for printing three copies is also less than that of the print instruction B. The blank pages 42, whose number is equal to the difference, are added to the last page of each of the first, second, and third copies.

In FIGS. 13A to 13C and 14A which describe the second exemplary embodiment, the print instruction A is an exemplary second print instruction, and the print instruction B is an exemplary first print instruction.

A process of changing the number of document copies by creating copies through replication of according to the second exemplary embodiment will be described.

Figure 15:
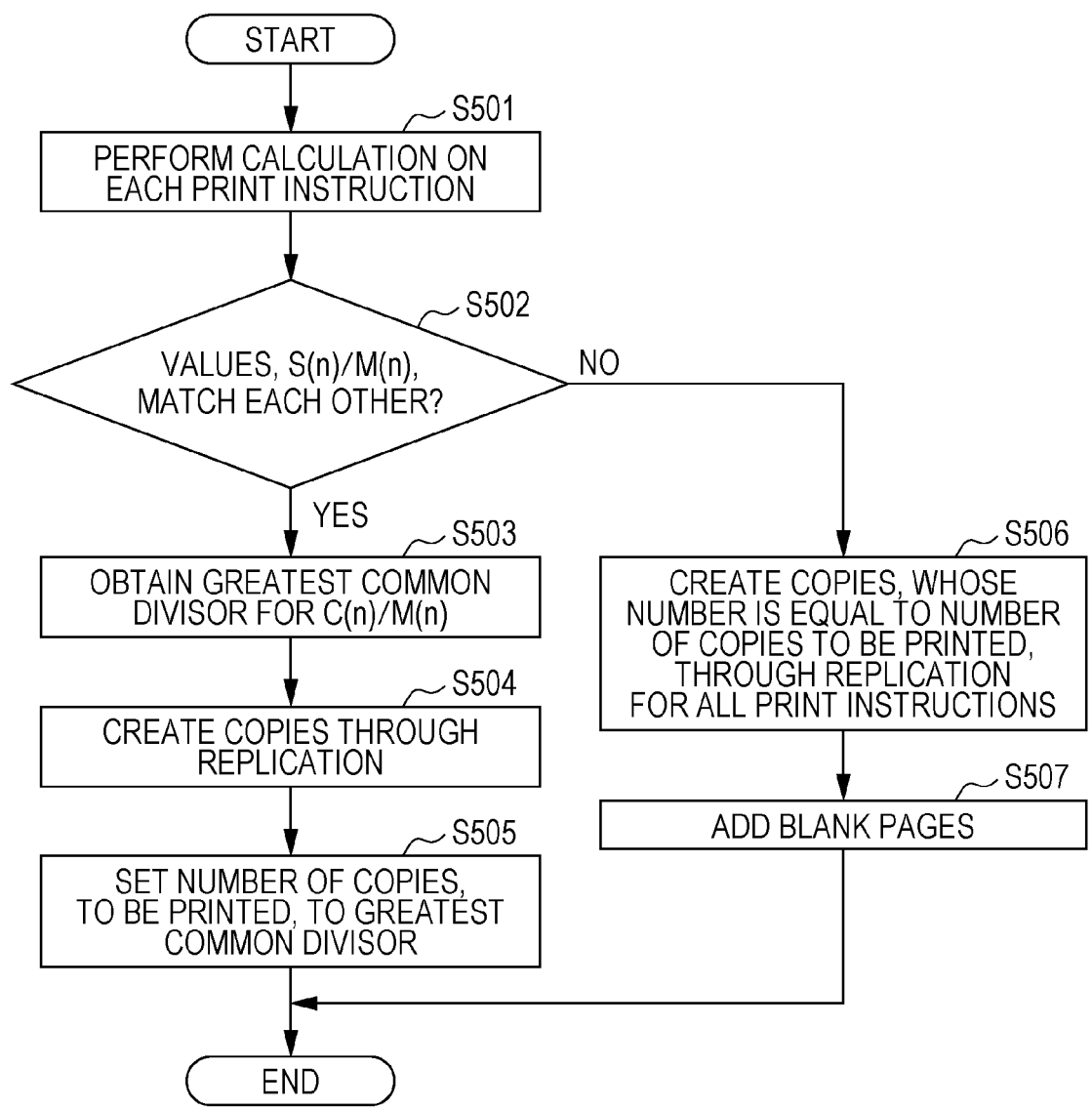
FIG. 15 is a flowchart describing a process of changing the number of document copies by creating copies through replication, according to the second exemplary embodiment.

FIG. 15 is a flowchart describing the process of changing the number of document copies by creating copies through replication according to the second exemplary embodiment, and illustrates the case in which one print instruction may be separated into multiple stacks.

Description will be made where M represents the number of stacks which may be disposed, and N represents the number of print instructions. In addition, J(n) represents the n-th print instruction; C(n) represents the number of copies, to be printed, of the n-th print instruction; S(n) represents the print sheet count of the n-th job (page count×the number of copies to be printed). Round(x) indicates the case in which a fractional value x is converted into an integer.

In the process example in FIG. 15, calculation is performed for each print instruction (step 501). Specifically, the calculation, $R(n)=M \times S(n)/\Sigma S$, is performed for each print instruction, and Round(R(n)) is obtained for each print instruction so that $\Sigma \text{Round}(R(n))=M$. The value of Round (R(n)) thus calculated is defined as M(n).

For example, assume the case in which the number M of stacks which may be disposed is six, and that the number N of print instructions is three. The page counts and the numbers of copies, to be printed, of print instructions J(1) to J(3) in this assumption are different from those of the print instructions A to C in FIGS. 13A to 13C described above.

Assume that the page count of the print instruction J(1) is 90; the page count of the print instruction J(2) is 15; the page count of the print instruction J(3) is 30; the number of copies, to be printed, of the print instruction J(1), that is, C(1), is one; the number of copies, to be printed, of the print instruction J(2), that is, C(2), is four; the number of copies, to be printed, of the print instruction J(3), that is, C(3), is one. The following values are obtained:

$S(1)$=page count×$C(1)$=90×1=90, $S(2)$=page count×$C(2)$=15×4=60, $S(3)$=page count×$C(3)$=30×1=30, $\Sigma S$=180;

$R(1)=M \times S(1)/\Sigma S$=6×90/180=3, $R(2)=M \times S(2)/\Sigma S$=6×60/180=2, $R(3)=M \times S(3)/\Sigma S$=6×30/180=1;

Round($R(1)$)=3=$M(1)$,

Round($R(2)$)=2=$M(2)$,

Round($R(3)$)=1=$M(3)$.

It is determined whether the values of S(n)/M(n) match each other for all the print instructions J(n) (n=1 to N) (step 502). If the values match each other (YES in step 502), the greatest common divisor is obtained for C(n)/M(n) (n=1 to N) (step 503). Copies, whose number is equal to C(n) divided by the greatest common divisor, are created through replication for each J(n) (step 504). The number of copies, to be printed, of the new print instruction (see reference character G in FIG. 10A) is set to the greatest common divisor (step 505). Such a process of changing the number of document copies causes the number of copies, to be printed, of each stack to set to one which is the common value.

Description will be made by taking the example described above:

print instruction $J(1)$: $S(1)/M(1)$=90/3=30, print instruction $J(2)$: $S(2)/M(2)$=60/2=30, print instruction $J(3)$: $S(3)/M(3)$=30/1=30.

Thus, the values match each other. Then, the greatest common divisor of C(n)/M(n) is obtained:

print instruction $J(1)$: $C(1)/M(1)=1/3$, print instruction $J(2)$: $C(2)/M(2)=4/2=2$, print instruction $J(3)$: $C(3)/M(3)=1/1=1$.

Thus, the greatest common divisor is one. The print instructions J(1) and J(3) are not subjected to creation of copies through replication, and the print instruction J(2) is subjected to creation of four copies through replication (4/1=4).

The number of copies, to be printed, of the new print instruction is set to one.

If the values do not match each other (NO in step 502), all the print instructions are subjected to creation of copies, through replication, whose number is equal to the number of copies to be printed (step 506). As a result, the number of copies, to be printed, of the print instruction of each stack is one. After that, among the first to N-th print instructions, the largest (the largest stack size) of the values, S(n)/M(n), is obtained. For the first to N-th print instructions, blank pages, whose number is equal to the value, the largest stack size×M(n)−S(n), are added (step 507).

For example, assume the example which is described in step 501 described above, and in which the page count of the print instruction J(1) is 120 instead of 90. That is, assume that the number of stacks which may be disposed is six; the number N of print instructions is three; the page count of the print instruction J(1) is 120; the page count of the print instruction J(2) is 15; the page count of the print instruction J(3) is 30; C(1) is one; C(2) is four; C(3) is one. The following values are obtained:

$S(1)$=page count×$C(1)$=120×1=120, $S(2)$=page count×$C(2)$=15×4=60, $S(3)$=page count×$C(3)$=30×1=30, $\Sigma S=210$;

$R(1)=M \times S(1)/\Sigma S=6 \times 120/210=3.42$, $R(2)=M \times S(2)/\Sigma S=6 \times 60/210=1.71$, $R(3)=M \times S(3)/\Sigma S=6 \times 30/210=0.85$;

Round($R(1)$)=3=$M(1)$,

Round($R(2)$)=2=$M(2)$,

Round($R(3)$)=1=$M(3)$.

The following values are obtained, and do not match each other (NO in step 502):

print instruction $J(1)$: 120/3=40, print instruction $J(2)$: 60/2=30, print instruction $J(3)$: 30/1=30.

After that, each print instruction is subjected to creation of copies, through replication, whose number is equal to the number of copies to be printed. The largest stack size Mmax is obtained, and Mmax is 40:

print instruction $J(1)$: $S(1)/M(1)=120/3=40$, print instruction $J(2)$: $S(2)/M(2)=60/2=30$, print instruction $J(3)$: $S(3)/M(3)=30/1=30$.

Therefore, the following values are obtained:

print instruction $J(1)$: $M\,\text{max} \times M(1)-S(1)=40 \times 3-120=0$, print instruction $J(2)$: $M\,\text{max} \times M(2)-S(2)=40 \times 2-60=20$, print instruction $J(3)$: $M\,\text{max} \times M(3)-S(3)=40 \times 1-30=10$.

No blank pages are added to the print instruction J(1); 20 blank pages are added to the end of the print instruction J(2); 10 blank pages are added to the end of the print instruction J(3).

A concrete example in the steps (see FIG. 12) for the print instructions J(1) to J(3) as the example described above will be described.

FIGS. 16A to 16C are diagrams describing a concrete example in the steps (see FIG. 12) for the print instructions J(1) to J(3). FIG. 16A illustrates a job list of a new print instruction including the multiple print instructions J(1) to J(3). FIG. 16B is a diagram describing an imposition process on the new print instruction. FIG. 16C is a diagram describing stacks formed through cutting after printing. FIGS. 16A to 16C correspond to FIGS. 14A, 14B, and 14D.

As described by the job list in FIG. 16A, the print instruction J(1) is separated into three parts, each of which has the banner page 43 added on the top. The print instruction J(2) is separated into two parts, each of which has the banner page 45 on the top, and blank pages 42 are added at the end of the second part. The print instruction J(3) is not separated, and the banner page 47 is added on the top and blank pages 42 are added at the end.

As illustrated in FIG. 16B, the single pages of the parts of the print instructions are collected, and imposed in the order of Z letter. As illustrated in FIG. 16C, through cutting after printing, stacks J(1)1, J(1)2, and J(1)3, stacks J(2)1 and J(2)2, and stack J(3) are formed.

That is, for the print instruction J(1) which has 120 pages and which is for printing one copy, the stacks J(1)1, J(1)2, and J(1)3 are stacked to obtain printed matter of one copy. For the print instruction J(2) which has 15 pages and which is for printing four copies, the stacks J(2)1 and J(2)2 are stacked, and the 20 blank pages 42 are removed from the end. Thus, printed matter of four copies is obtained. The 10 blank pages 42 are removed from the stack J(3). Thus, printed matter of one copy is obtained.

Thus, for the print instruction J(2), the printed matter including two stacks (stacks J(2)1 and J(2)2) is obtained. Ten blank pages are not added at the end of each stack for the print instruction J(2). Instead, 20 pages are added at the end of the second stack for the print instruction J(2). In other words, among the 60 pages of the print instruction J(2), the first stack has 40 pages and the second stack has 20 pages. Twenty blank sheets are added to the end of the second stack.

That is, the print instruction J(2) has 15 pages, and is for printing four copies. The total, 60, is less than the page count of the print instruction J(1) which has 120 pages and which is for printing one copy. In this case, the position, at which the blank pages 42 are added to the print instruction J(2), is set to the subsequent position of the last page of the fourth copy which is the last copy of the four copies. Therefore, blank pages are added to the end of the second stack.

The print instruction J(1) is an exemplary first print instruction. The print instruction J(2) is an exemplary second print instruction.

The print instruction J(2) will be described additionally. Assume the following control: the first stack has 30 pages, and the second stack also has 30 pages; 10 blank sheets are added to the end of each stack. Such control may be employed, for example, when the postprocessing facility has a sorting unit or when an instruction is transmitted from a worker. That is, the blank pages, which have been added to the first stack, are in the middle of all the 60 pages. Blank pages may be added at a middle position of the series of image pages from the first page to the last page of the print instruction J(2).

A postprocessing step in the workflow (see FIG. 12) according to the second exemplary embodiment will be described. The postprocessing step herein is a process performed after generation of print data (see step 409 in FIG. 12) which is described in the second exemplary embodiment.

Figure 17:
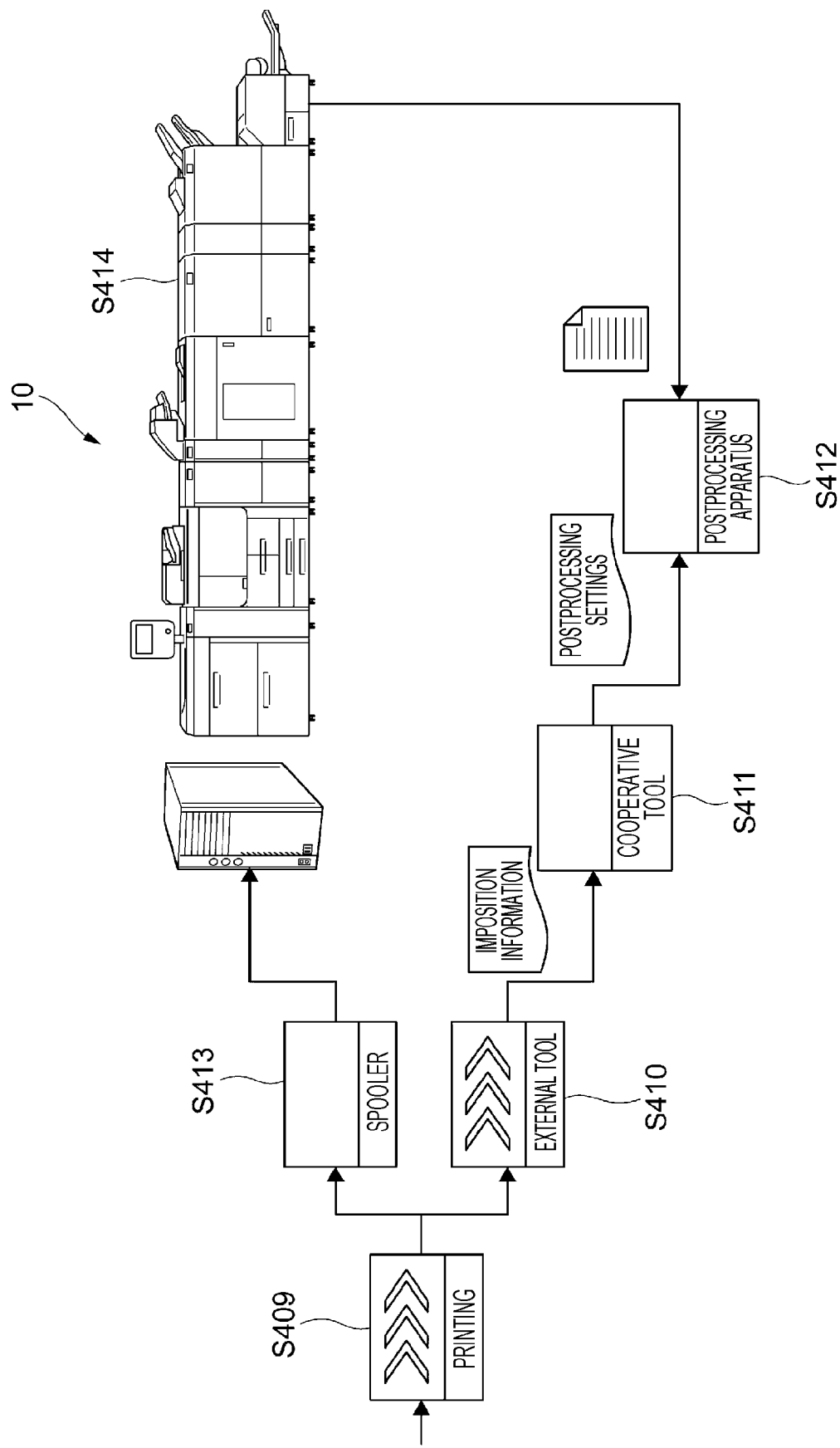
FIG. 17 is a diagram describing postprocessing steps in a workflow according to the second exemplary embodiment.

FIG. 17 is a diagram describing the postprocessing step in the workflow according to the second exemplary embodiment.

After generation of print data (step 409) illustrated in FIG. 17, the print data is transmitted to an external tool (step 410), and imposition information is input to a cooperative tool (step 411). Information about postprocessing settings is input to a postprocessing apparatus (step 412).

The information about postprocessing setting may be input to the postprocessing apparatus through manual input, input by reading a bar code, or data transmission.

The print data is spooled (step 413), and is transmitted to the printer 10 for printing. The printed matter, which has been printed, is transported to the postprocessing apparatus (see step 412), and, for example, sorting and cutting are performed.

As described above, according to the present exemplary embodiment, the first exemplary embodiment, and the second exemplary embodiment, blank pages, which are imposed on sheets having multiple imposed pages on the same surface, are set so that cut and stack imposition printing is performed to obtain a result of cut and split imposition.

Especially, when blank pages are added to a print instruction for printing multiple copies, the position of the blank pages is determined by using the total of the page counts of the copies (see FIG. 10), or the position is determined by using the page count of each copy (see FIG. 14). In the case of the former, the position of blank pages is set to the subsequent position of the page whose number is equal to the total (the last page of the last copy). In the case of the latter, the position of blank pages is set to the subsequent position of the page whose number is equal to the page count of each copy (the last page of each of the multiple copies).

The case in which the position, at which blank pages are added, is the subsequent position of the last page is described. The case is not limited to this. The position may be set to the precedent position of the first page. Specifically, in the case of the former, the position of blank pages is set to the precedent position of the first page of the first copy. In the case of the latter, the position of blank pages is set to the precedent position of the first page of each copy.

In the present exemplary embodiment, the first exemplary embodiment, and the second exemplary embodiment, the case in which each of the multiple print instructions included in a new print instruction is for single-side printing is described. The case is not limited to this. The exemplary embodiments may be applied to the case in which each print instruction is for duplex printing. The case in which single-side printing and duplex printing are mixed increases the number of blank pages. Thus, the exemplary embodiments are not necessarily applied to such a case.

In the case of duplex printing, when there is a print instruction which has pages, whose number is odd, and which is for printing multiple copies, a blank page needs to be added at positions of separation between copies.

In the embodiments above, the term "processor" refers to hardware in a broad sense. Examples of the processor include general processors (e.g., CPU) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to:
      receive a plurality of print instructions; and
      generate a new print instruction including the plurality of received print instructions, the new print instruction being an instruction in which at least one predetermined page is added to top or end of a second print instruction, the second print instruction having a page count less than a page count of a first print instruction, the page count of the first print instruction being the highest among the plurality of print instructions, the at least one added, predetermined page having a page count equal to a difference between the page count of the first print instruction and the page count of the second print instruction.

2. The information processing apparatus according to claim 1,
   wherein, if a print instruction included in the plurality of print instructions is for printing a plurality of copies, a page count of the print instruction is a total obtained by summing page counts of the copies of the print instruction, and
   wherein a position, at which the at least one predetermined page is added to the print instruction for printing the plurality of copies, is determined by using the total.

3. The information processing apparatus according to claim 2,
   wherein, when the second print instruction is for printing a plurality of copies,
   the position, at which the at least one predetermined page is added to the second print instruction, is set to a subsequent position of a last page of a last copy among the plurality of copies or a precedent position of a first page of a first copy among the plurality of copies, the plurality of copies being used to obtain the total.

4. The information processing apparatus according to claim 2, wherein, when a third print instruction is for printing a plurality of copies and the total is equal to the page count of the first print instruction, the third print instruction being other than the first print instruction and the second print instruction among the plurality of print instructions, a position, at which the at least one predetermined page is added to the third print instruction, is not set.

5. The information processing apparatus according to claim 1, wherein the page count of each of the plurality of print instructions is the page count of each copy of the print instruction even when the print instruction is for printing a plurality of copies, and wherein a position, at which the at least one predetermined page is added to the print instruction for printing the plurality of copies, is determined by using the page count of each copy.

6. The information processing apparatus according to claim 5, wherein, when the second print instruction is for printing a plurality of copies, a position, at which the at least one predetermined page is added to the second print instruction, is set to a subsequent position of a last page of each of the plurality of copies or a precedent position of a first page of each of the plurality of copies.

7. The information processing apparatus according to claim 5, wherein, when the second print instruction is for printing a plurality of copies, if a total for the second print instruction is less than the page count of the first print instruction, the total for the second print instruction being obtained by summing the page counts of the copies of the second print instruction, a position, at which the at least one predetermined page is added to the second print instruction, is set to a subsequent position of a last page of a last copy of the plurality of copies or a precedent position of a first page of a first copy of the plurality of copies.

8. The information processing apparatus according to claim 1, wherein, in the new print instruction, an image page is added before a first page of each of the plurality of print instructions, the image page describing information about the print instruction.

9. The information processing apparatus according to claim 8, wherein the information about the print instruction indicates the print instruction.

10. The information processing apparatus according to claim 8, wherein the information about the print instruction is information about a copy count when the print instruction is for printing a plurality of copies.

11. The information processing apparatus according to claim 8, wherein the information about the print instruction describes whether at least one predetermined page is included, and describes the at least one predetermined page when the at least one predetermined page is included.

12. A print system comprising:

a unit that receives a plurality of print instructions; and a unit that generates a new print instruction including the plurality of received print instructions, the new print instruction being an instruction in which at least one predetermined page is added to top or end of a second print instruction, the second print instruction having a page count less than a page count of a first print instruction, the page count of the first print instruction being the highest among the plurality of print instructions, the at least one added, predetermined page having a page count equal to a difference between the page count of the first print instruction and the page count of the second print instruction.

13. A non-transitory computer readable medium storing a program causing a computer to execute a process for an information processing apparatus, the process comprising:

receiving a plurality of print instructions; and generating a new print instruction including the plurality of received print instructions, the new print instruction being an instruction in which at least one predetermined page is added to top or end of a second print instruction, the second print instruction having a page count less than a page count of a first print instruction, the page count of the first print instruction being the highest among the plurality of print instructions, the at least one added, predetermined page having a page count equal to a difference between the page count of the first print instruction and the page count of the second print instruction.

14. The non-transitory computer readable medium according to claim 13, wherein, if a print instruction included in the plurality of print instructions is for printing a plurality of copies, a page count of the print instruction is a total obtained by summing page counts of the copies of the print instruction, and wherein a position, at which the at least one predetermined page is added to the print instruction for printing the plurality of copies, is determined by using the total.

15. The non-transitory computer readable medium according to claim 14, wherein, when the second print instruction is for printing a plurality of copies, the position, at which the at least one predetermined page is added to the second print instruction, is set to a subsequent position of a last page of a last copy among the plurality of copies or a precedent position of a first page of a first copy among the plurality of copies, the plurality of copies being used to obtain the total.

16. The non-transitory computer readable medium according to claim 14, wherein, when a third print instruction is for printing a plurality of copies and the total is equal to the page count of the first print instruction, the third print instruction being other than the first print instruction and the second print instruction among the plurality of print instructions, a position, at which the at least one predetermined page is added to the third print instruction, is not set.

17. The non-transitory computer readable medium according to claim 13, wherein the page count of each of the plurality of print instructions is the page count of each copy of the print instruction even when the print instruction is for printing a plurality of copies, and wherein a position, at which the at least one predetermined page is added to the print instruction for printing the plurality of copies, is determined by using the page count of each copy.

18. The non-transitory computer readable medium according to claim 17,
wherein, when the second print instruction is for printing a plurality of copies,
a position, at which the at least one predetermined page is added to the second print instruction, is set to a subsequent position of a last page of each of the plurality of copies or a precedent position of a first page of each of the plurality of copies.

19. The non-transitory computer readable medium according to claim 17,
wherein, when the second print instruction is for printing a plurality of copies,
if a total for the second print instruction is less than the page count of the first print instruction, the total for the second print instruction being obtained by summing the page counts of the copies of the second print instruction,
a position, at which the at least one predetermined page is added to the second print instruction, is set to a subsequent position of a last page of a last copy of the plurality of copies or a precedent position of a first page of a first copy of the plurality of copies.

20. The non-transitory computer readable medium according to claim 13,
wherein, in the new print instruction, an image page is added before a first page of each of the plurality of print instructions, the image page describing information about the print instruction.

* * * * *